US009986004B1

(12) United States Patent
Carruth et al.

(10) Patent No.: US 9,986,004 B1
(45) Date of Patent: May 29, 2018

(54) METHOD AND SYSTEM FOR CONTENT DELIVERY BASED ON USER PREFERENCES

(71) Applicants: Chris Carruth, North Richland Hills, TX (US); Raymond Wilczynski, Burleson, TX (US)

(72) Inventors: Chris Carruth, North Richland Hills, TX (US); Raymond Wilczynski, Burleson, TX (US)

( * ) Notice: Subject to any disclaimer, the term of this patent is extended or adjusted under 35 U.S.C. 154(b) by 147 days.

(21) Appl. No.: 15/252,096

(22) Filed: Aug. 30, 2016

Related U.S. Application Data

(60) Provisional application No. 62/211,806, filed on Aug. 30, 2015.

(51) Int. Cl.
| H04L 29/06 | (2006.01) |
| H04N 21/45 | (2011.01) |
| H04N 21/258 | (2011.01) |
| H04N 21/266 | (2011.01) |

(52) U.S. Cl.
CPC ... *H04L 65/4084* (2013.01); *H04N 21/25816* (2013.01); *H04N 21/266* (2013.01); *H04N 21/4532* (2013.01)

(58) Field of Classification Search
USPC ....... 709/203, 206, 217, 219, 223, 224, 226, 709/228, 231, 232, 238; 705/26.1, 26.61; 704/8; 725/91
See application file for complete search history.

(56) References Cited

U.S. PATENT DOCUMENTS

| 7,418,409 | B1* | 8/2008 | Goel | G06Q 10/02 705/26.61 |
| 7,831,243 | B2 | 11/2010 | Thomas | |
| 8,145,536 | B1* | 3/2012 | Goel | G06Q 10/02 705/26.1 |
| 8,561,116 | B2* | 10/2013 | Hasek | H04L 67/2823 725/91 |
| 9,456,308 | B2 | 9/2016 | De Assuncao et al. | |
| 2008/0139112 | A1 | 6/2008 | Sampath et al. | |
| 2008/0189099 | A1* | 8/2008 | Friedman | G06F 17/30766 704/8 |
| 2010/0057563 | A1* | 3/2010 | Rauber | G06Q 30/02 709/217 |
| 2010/0057924 | A1* | 3/2010 | Rauber | G06Q 30/00 709/229 |
| 2013/0080218 | A1 | 3/2013 | Wildern, IV et al. | |

* cited by examiner

*Primary Examiner* — Quang N Nguyen

(57) ABSTRACT

A method and a system for content delivery based on user preferences are provided. The method includes accessing profiles of a plurality of users, where the profiles include sensitivity of each user to at least one of a cost parameter, a content parameter, a viewing parameter, a hardware parameter, a channel parameter, a network parameter, and an advertising parameter; performing a first trade-off analysis to determine a plurality of content delivery options for providing content to a first user, wherein the first trade-off analysis is based on profile of the first user; generating a first report including at least one content delivery option from the plurality of content delivery options; receiving an input from the first user for optimizing the at least one content delivery option; generating optimized first report including optimized content delivery option; and implementing the optimized content delivery option to provide content to the first user.

17 Claims, 16 Drawing Sheets

METHOD AND SYSTEM FOR CONTENT DELIVERY BASED ON USER PREFERENCES

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

TECHNICAL FIELD

The present disclosure generally relates to methods and systems for content delivery and, more particularly to methods and systems for content delivery based on user preferences.

BACKGROUND

Over a period of time, delivery of content, such as video content, has become more challenging due to the inability of content viewers to customize what they watch and pay only for what they watch. Many times, features that are not desired by a user are delivered to the user at an increased cost. More specifically, no option is provided to the user to customize how content is delivered that reflects the innate and oftentimes multiple and sometimes conflicting decision making parameters that go into the content sourcing, viewing and paying decision making process.

In one existing solution, predefined options are provided to the user and the user has to select one option based on which the content is delivered to the user. However, no optimization related options are provided to the user and the user has to select a suitable option from the predefined options. Such content delivery mechanism restricts level of customization available to the user resulting into an unmet need of content delivery based on user preferences. Hence, an improved method and system for content delivery based on the user preferences is desired.

SUMMARY

Various methods, systems and computer readable mediums for content delivery based on user preferences are disclosed.

In an embodiment, a system for content delivery based on user preferences is provided. The system includes a memory to store instructions, and a processor coupled to the memory and configured to perform the method of content delivery based on user preferences. The method includes accessing profiles of a plurality of users. The profiles include sensitivity of each user to at least one of a cost parameter, a content parameter, a viewing parameter, a hardware parameter, a channel parameter, a network parameter, and an advertising parameter. Also, the method includes performing a first trade-off analysis to determine a plurality of content delivery options for providing content to a first user. The first trade-off analysis is based on profile of the first user including the sensitivity of the first user. The method also includes generating a first report including at least one content delivery option from the plurality of content delivery options. Further, the method includes receiving an input from the first user for optimizing at least one content delivery option. The method also includes generating optimized first report including optimized content delivery option. Furthermore, the method includes implementing the optimized content delivery option to provide content to the first user.

In another embodiment, a method for content delivery based on user preferences is provided. The method includes accessing profiles of a plurality of users. Further, the method includes applying rules based on profile of a first user to identify a first plurality of content sources for providing content to the first user. The method also includes performing a first trade-off analysis to determine a second plurality of content sources from the first plurality of content sources for providing content to the first user, wherein the first trade-off analysis is based on sensitivity of the first user to at least one of a cost parameter, a content parameter, a viewing parameter, a hardware parameter, a channel parameter, a network parameter, and an advertising parameter. The method further includes generating a first report including content options from the second plurality of content sources. Furthermore, the method includes receiving an input from the first user selecting a first content option. Also, the method includes implementing the first content option for the first user to provide the content to the first user from the first content option.

In yet another embodiment, a non-transitory computer-readable medium having stored instructions which when executed by a system causes the system to perform a method for content delivery based on user preferences is provided. The method includes accessing profiles of a plurality of users. The profiles include sensitivity of each user to at least one of a cost parameter, a content parameter, a viewing parameter, a hardware parameter, a channel parameter, a network parameter, and an advertising parameter. Also, the method includes performing a first trade-off analysis to determine a plurality of content delivery options for providing content to a first user. The first trade-off analysis is based on profile of the first user including the sensitivity of the first user. The method also includes generating a first report including at least one content delivery option from the plurality of content delivery options. Further, the method includes receiving an input from the first user for optimizing the at least one content delivery option. The method also includes generating optimized first report including optimized content delivery option. Furthermore, the method includes implementing the optimized content delivery option to provide content to the first user.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
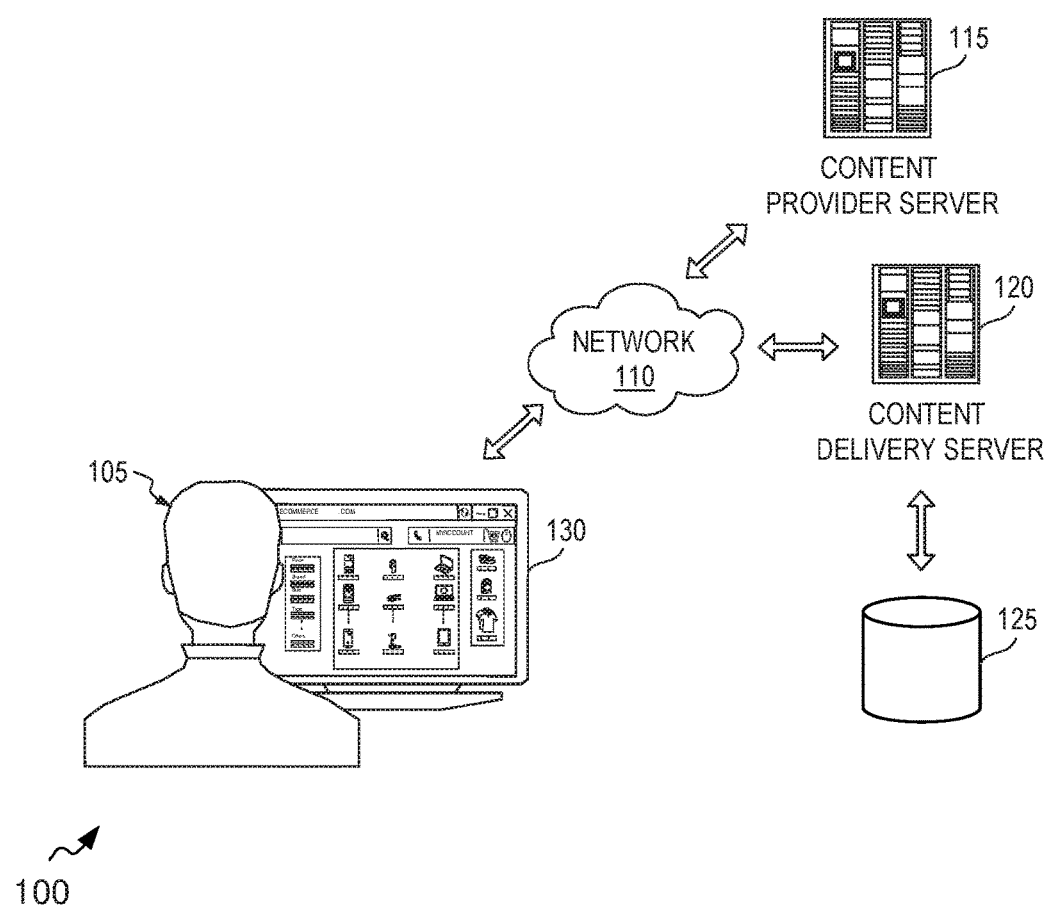
FIG. 1 illustrates an example environment, where at least some embodiments of the present disclosure may be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

In various embodiments, systems and methods for content delivery based on user preferences are provided. A user accesses an application present on a user device (also known as 'access device') via a web browser. The user details are collected by a server, and are stored as user profile. The server could be in a data center, on a desk, could be a high end computer of can be any other hardware capable of ingesting and storing user information. Other details including user preferences (also known as sensitivity or trade off) on various parameters, such as one or more of a cost parameter, a content parameter, a viewing parameter, a hardware parameter, a channel parameter, a network parameter, and an advertising parameter, are also collected via one or more sources and are stored as part of the user profile. The user profile is accessible by the server or by the application. The server provides content delivery options to the user based on the user profile. For providing the content delivery options, there could be back and forth communication between the application and the server.

For example, in one embodiment, the method includes performing a trade-off analysis to determine a plurality of content delivery options for providing content to the user. The trade-off analysis is based on profile of the user (i.e. the user profile including user preferences). The user preferences include trade off parameters (cost, speed, commercials, etc.) which are processed via mathematical models to generate a configuration of services and equipment that result in the user's desired viewing preference. Also, the method includes generating a report including at least one content delivery option from the plurality of content delivery options. Furthermore, the method includes receiving an input from the user for optimizing the at least one content delivery option. The method also includes generating optimized report including optimized content delivery option. Further, the method includes implementing the optimized content delivery option to provide content to the user. The implementing as described herein includes providing instructions to the user to implement. Similar method is followed for different users to provide different content delivery options to different users based on their respective user profiles.

In another embodiment, the method includes applying rules based on profile of the user to identify a first plurality of content sources for providing content to the user. The method also includes performing a trade-off analysis to determine a second plurality of content sources from the first plurality of content sources for providing content to a first user, wherein the trade-off analysis is based on sensitivity of the first user to at least one of a cost parameter, a content parameter, a viewing parameter, a hardware parameter, a channel parameter, a network parameter, and an advertising parameter. The method further includes generating a report including content options from the second plurality of content sources. Furthermore, the method includes receiving an input from the user selecting a content option. Also, the method includes implementing the content option for the user to provide the content to the user from the content option. Similar method is followed for different users to provide different content options to different users based on their respective user profiles.

The content options and the content delivery options are used interchangeably to refer to both the content and the content delivery options.

The present disclosure is now described in detail using various figures.

FIG. 1 illustrates an example environment 100, where various embodiments of the present disclosure may be practiced. An example representation of the environment 100 is shown depicting a network 110 that connects entities such as a user 105 and a content delivery server 120. In one embodiment, the content delivery server 120 only delivers configuration of entertainment sources/prices and equipment sources/prices but not the content. The network 110 may be a centralized network or may comprise a plurality of sub-networks that may offer a direct communication between the entities or may offer indirect communication between the entities. Examples of the network 110 include wireless networks, wired networks, and combinations thereof. Some non-exhaustive examples of the wireless networks may include wireless local area networks (WLANs), Bluetooth or Zigbee networks, cellular networks and the like. Some non-exhaustive examples of wired networks may include Local Area Networks (LANs), Ethernet, Fiber Optic networks and the like. An example of a combination of wired networks and wireless networks may include the Internet.

The user 105 is connected to the network 110 via a user device or an access device 130 (hereinafter referred to as 'the device 130'). Examples of the device 130 include, but not limited to, a desktop, a laptop, a smartphone, a tablet, a smart watch, a smart television, a smart device in home, and other such system having capability to provide content to the user 105.

In some example embodiments, the content delivery server 120 may include one or more processing elements (e.g., computing systems, databases, etc.) to process the information received from the device 130 and to perform the content delivery process.

In some example embodiments, the content delivery server 120 maintains an infrastructure for hosting applications, such as for example content delivery application, an instance of which may be installed on the device 130. The device 130 interacts with the content delivery server 120 for various purposes, for example, the device 130 provides data and receives data from the content delivery server 120. It is understood that the functionalities of the content delivery server 120 can be embodied in form of cloud services and/or subscription services.

In one embodiment, the content delivery server 120 and the device 130 execute various methods as described in the present disclosure. In another embodiment, the content delivery server 120 receives one or more inputs from the device 130 and performs all operations of the one or more methods as described in present disclosure. In yet another embodiment, the device 130 performs operations of the one or more methods as described herein.

The device 130 is depicted to include the content delivery application. The content delivery application enables the user 105 to provide data and receive data from the content delivery server 120.

The environment 100 also includes a storage 125 accessible by the content delivery server 120 directly or via the network 110. The user profiles and other data can be stored in the storage 125.

In some embodiments, the environment 100 also includes a content provider server 115. The content provider server 115 includes content which can be provided via the content delivery server 120 in partnership or in other forms. Alternatively, the content delivery server 120 may have content of its own for providing it to the user 105.

Figure 2:
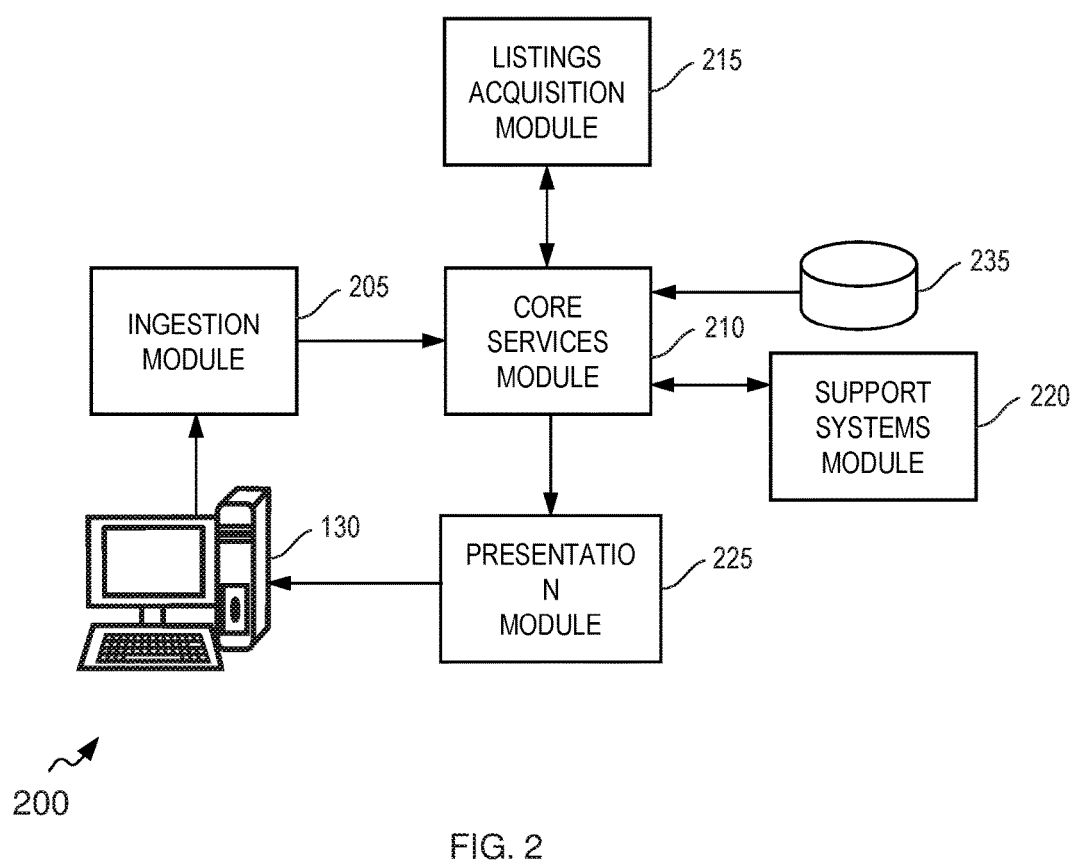
FIG. 2 illustrates an example of a system for content delivery based on user preferences, in accordance with an example embodiment.

FIG. 2 illustrates an example of a system 200, such as the content delivery server 120, for content delivery based on user preferences, in accordance with an example embodiment.

The system 200 includes an ingestion module 205, a core services module 210, a listings acquisition module 215, a support system module 220, and a presentation module 225. The system 200 may be installed on one or more networked computers and/or a server of an entity such as, but not limited to, a company or a government agency.

The ingestion module 205 receives consumer information from the device 130. The device 130 may be any device that can receive consumer information and can display a graphical interface. Examples of the device 130 may include, but are not limited to, a computer terminal, a smartphone, a laptop, a desktop, an all-in-one computer, a tablet, a netbook, an ultrabook, a personal digital assistant (PDAs), a gaming consoles, a Chromebook®, a Cloudbook®, a Chromebox®, a Kindle®, a mobile phone, a modular smartphone, an iPhone®, an electronic tech wearable, or a smart TV. Examples of consumer inputs information relevant to the content delivery may include, but are not limited to, a physical address, the number of levels in the home structure, presence of a basement, topology of the home network, a home networking communications medium, one or more existing TV antenna(s), demographic information, one or more favorite shows or content genres, an importance of content genres, an importance of specific shows, a monthly bill for entertainment content from paid content providers, an indicator of willingness to delay a viewing of content, an indicator of how much a subscriber is willing to delay a viewing of entertainment content, a subscription to communications bundles, a price of subscriptions to communication bundles, an expiration date of any bundled communications bundles, an expiration date of any individual component within a bundled package, an answer to technical expertise survey, an in-home bandwidth, a number of TVs that a consumer desires to stream video to, a number of TVs needed to have a stream on at same time, a present use of streaming video solutions, a name of a streaming service or content package, an indication of whether such service is advertising based or membership based, and/or a degree of aversion to advertising supported content on the device 130. Gathered consumer information is sent to the core services module 210 and may be stored in whole or in part on a database system 235, or the storage 125, as a user profile.

In one embodiment, topology of the home network is contemplated to include the collective presence of, but not limited to, physical wiring and/or wireless components of any type capable of carrying a video stream, and the platforms, both wireline and wireless (routers, gateways, modems, access points, etc.) necessary to enable viewing and usage of video and non-video content on various user devices (routers, gateways, modems, game platforms, smart phones, pads, etc.) that exist on or around the customer premise. These platforms and wiring/wireless infrastructure may enable content viewing and usage by routing content over WiFi, WiMax, powerline Ethernet, home computers configured as media servers, set top boxes, DVRs, OTA DVRs, Smart TVs, handheld devices (Kindles/PDAs) and others as are developed.

The core services module 210 receives consumer information from the ingestion module 205 and/or the database system 235. The core services module 210 requests the listings acquisition module 215 for a list of available content sources such as, but not limited to, over the air content providers, streaming video on demand services, digital content providers, mobile content providers, content delivery networks, content commerce providers, social media sites, content commerce providers, distribution and delivery providers, online content providers, and/or streamed pay per view events. Once the core services module 210 receives a list of available content sources, logical rules are applied to determine a set of consumer content options. Logical rules may use one or more elements of information to limit and/or organize the set of consumer content options. The one or more elements of information may include, but is not limited to, a set of carriage restrictions, a set of regulatory restrictions, a physical address, the number of levels in the home structure, presence of a basement, topology of the home network, a home networking communications medium, one or more existing TV antenna(s), demographic information, one or more favorite shows or content genres, an importance of content genres, an importance of specific shows, a monthly bill for entertainment content from paid content providers, an indicator of willingness to delay a viewing of content, an indicator of how much a subscriber is willing to delay a viewing of entertainment content, a subscription to communications bundles, a price of subscriptions to communication bundles, an expiration date of any bundled communications bundles, an expiration date of any individual component within a bundled package, an answer to technical expertise survey, an in-home bandwidth, a number (#) of TVs that a consumer desires to stream video to, a number of TVs needed to have a stream on at same time, a present use of streaming video solutions, name of a streaming service or content package, an indication of whether such service is advertising based or membership based, and/or a degree of aversion to advertising supported content. Cost analysis may be performed on the set of consumer content options to further limit and/or organize the set of consumer content options. A report is generated using the set of consumer content options and may be then sent to the presentation module 225 for consumer presentation and feedback.

A consumer (also referred to as the user 105 or subscriber or content consumer) may edit or submit the information associated with corresponding user profile after viewing the report generated by the core services module 210. The core services module 210 may generate a new report from the updated information provided by the consumer. Additionally, the consumer may accept a consumer content option from a report and choose to view a more detailed report on the accepted consumer content option.

The system 100 may have one or more support system modules 220. The support system module 220 may send additional information or logical rules to the core services module 210. The support system module 220 may be any operational and/or business support system such as, but not limited to, order management system(s), payment system(s), logistical service system(s), subscriber management system(s), fleet dispatching system(s), fleet management system(s), back office system(s), ad management system(s), recommendation engine(s), device capabilities system(s), customer notification system(s), wired and/or wireless communications provider sourcing engine(s), regulatory compliance system(s), listing authentication system(s), system security system(s), and/or an access control system.

The presentation module 225 receives a report from the core services module 210 and the support systems module 220 that contains consumer content delivery options. The presentation module 225 formats the report for display to a consumer associated with the device 130.

It may be appreciated by a person with ordinary skill in the art that information gathered by the ingestion module 205 may include consumer preferences. A consumer may input subjective preferences such as, but not limited to, a preferred content, a sensitivity to losing content, a sensitivity to delayed viewing of content, a content importance by content type, an importance of cost savings versus potential loss of content, a number of TVs the consumer requires to have streamed video present, a number of TVs needed to have a same stream on at a time, a degree of aversion to advertising supported services, a subjective liking or disliking towards a current content provider, a subjective rating of "value" a consumer gets from a current content provider, and/or preferred screen resolution for shown content. In another embodiment of the present disclosure, a consumer may input a monetary value to his/her time among other subjective preferences to the ingestion module 205.

It may be appreciated by a person with ordinary skill in the art that the ingestion module 205 may automatically draw consumer information from the device 130. Information drawn from the device 130 may include, but is not limited to, internet browser name, internet browser version, hardware components, operating system, payment applications, screen resolution, keyboard profile, real-time geographic location, location search queries, wireless phone number, type of device or mobile network being used, device's IMEI number or SIM card ID, personal information, calendar, account credentials, settings, preferences, other personally identifiable information, interactions with third party websites and services, carrier ID, tower ID, signal strength of visible WiFi or cell tower(s), operational health of Wi-Fi access point(s). In an alternative embodiment of the present disclosure, the ingestion module 205 may receive consumer information such as a consumer's preferred media genre from metadata stored in the device 130.

Figure 3:
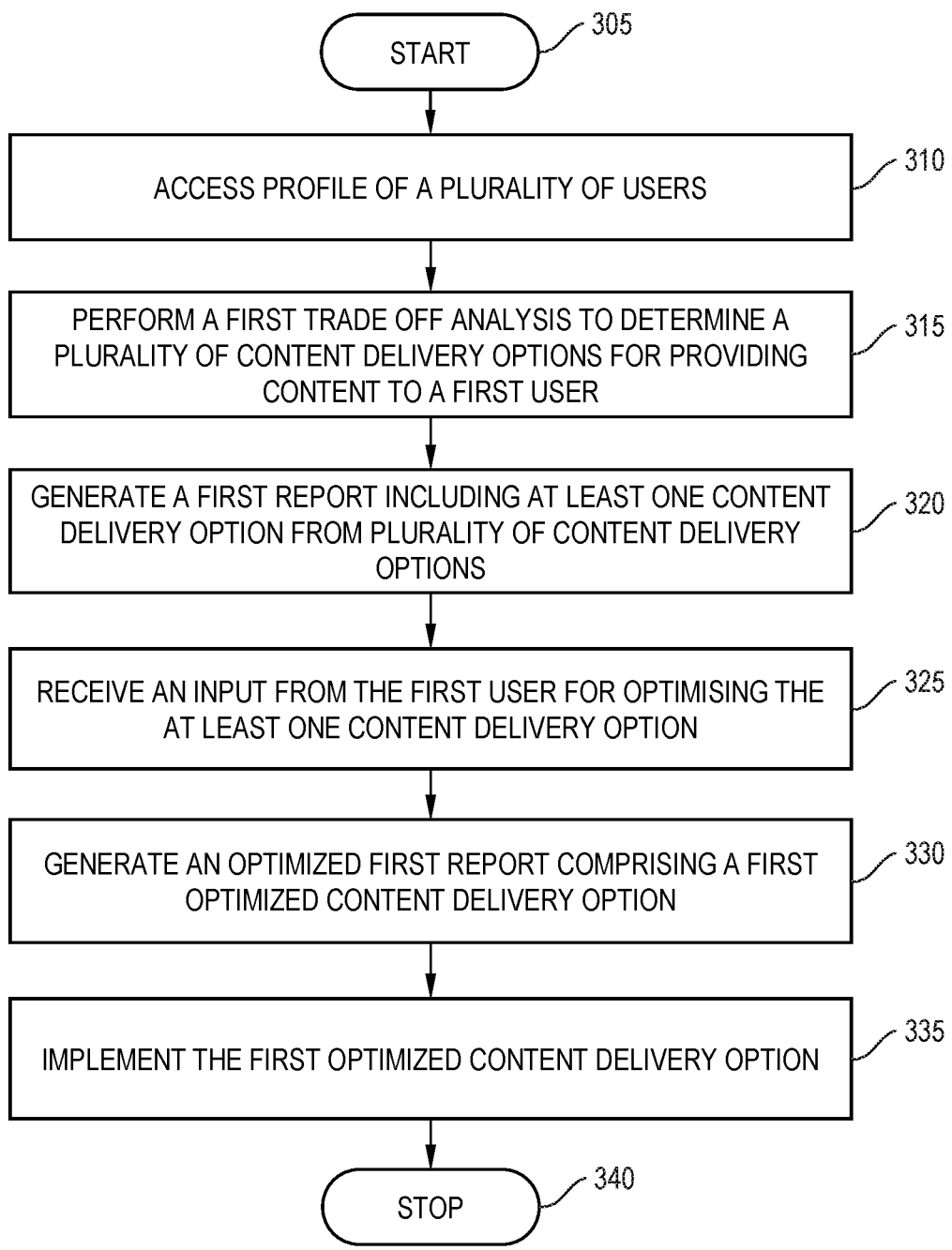
FIG. 3 depicts an example method for content delivery based on user preferences, in accordance with an example embodiment.

FIG. 3 depicts an example method for content delivery based on user preferences, in accordance with an example embodiment.

The method starts at operation 305.

At operation 310, profiles of a plurality of users are accessed. The profile of a user includes user preferences as described herein, for example in FIG. 2. The user preferences can be collected at various points using various technologies. The profiles also include sensitivity of each user to at least one of a cost parameter, a content parameter, a viewing parameter, a hardware parameter, a channel parameter, a network parameter, an advertising parameter, and/or any other parameter as described herein or within scope of this description. Examples of each parameter are described with reference to FIG. 2.

At operation 315, a first trade-off analysis is performed to determine a plurality of content delivery options for providing content to a user (e.g., a first user). The trade-off analysis includes applying rules to the content delivery options to remove some content delivery options and to shortlist the content delivery options relevant for the user based on the user profile including the sensitivity of the user. Various suitable algorithms can be used for this purpose.

At operation 320, a first report including at least one content delivery option from the plurality of content delivery options is generated. The first report includes content delivery option with various optimization options as described in detail in various figures herein.

At operation 325, an input is received from the user (i.e. the first user) for optimizing the at least one content delivery option.

At operation 330, an optimized first report is generated based on the input. The optimized first report includes the optimized content delivery option.

At operation 335, the optimized content delivery option is implemented for the user. In one embodiment, the implementation refers to the user buying and subscribing, and the service provider providing installing and support.

The method stops at operation 340.

It should be noted that the operations 315 to 335 are described for the content delivery to a single user for the description purposes only, for example, for the first user. However, it should be noted that these operations can also performed simultaneously for a second user or any number of users of the plurality of users. For instance, for the second user, a second trade-off analysis is performed to determine another plurality of content delivery options. Further, a second report is generated comprising at least one content delivery option from another plurality of content delivery options, wherein the second report may have different content delivery options than the first report generated for the first user. Further upon receipt of the input from the second user for optimizing the at least one content delivery option, an optimized second report comprising a second optimized content delivery option is generated. Thereafter, the second optimized content delivery option is implemented to provide content to the second user.

Figure 4:
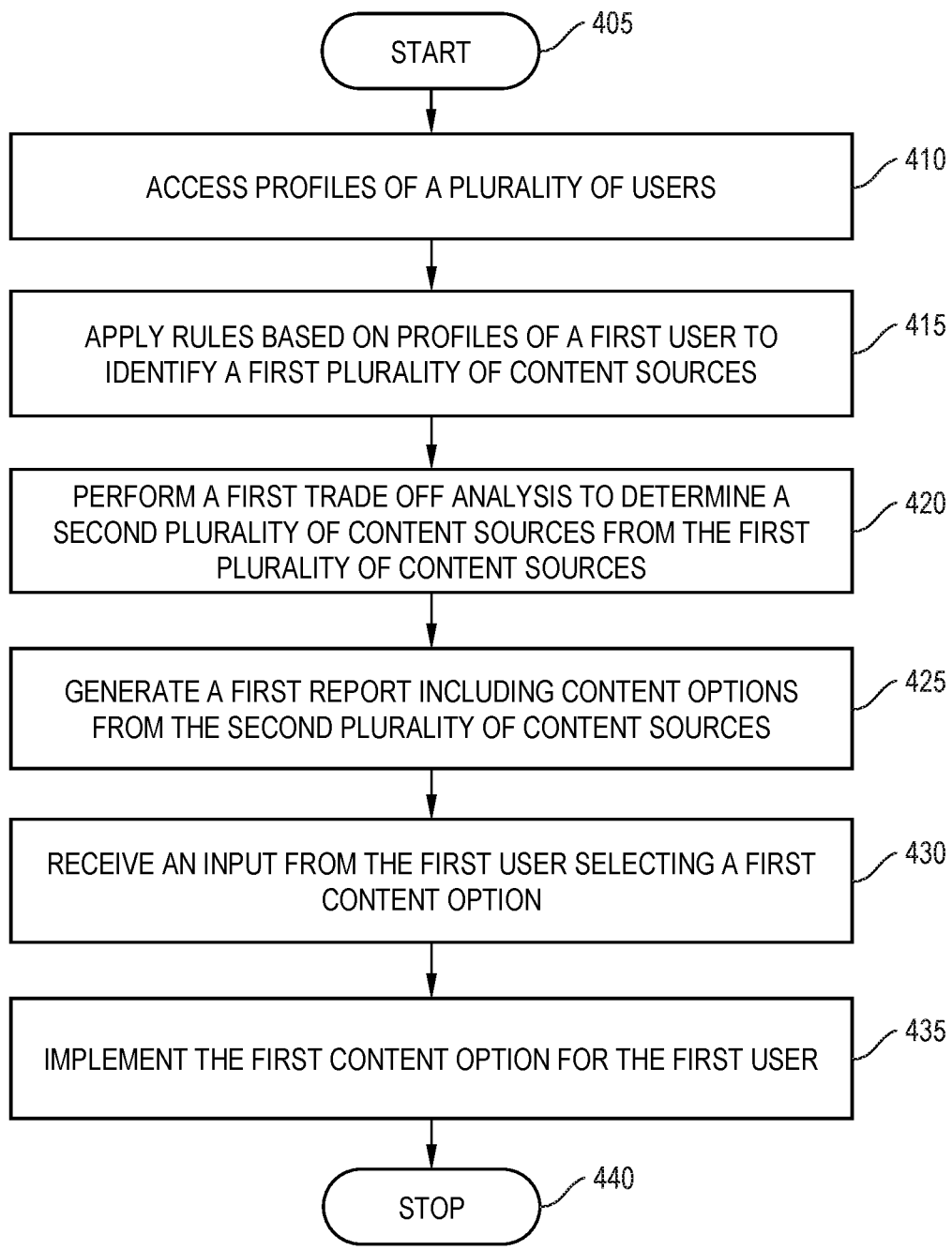
FIG. 4 depicts an example method for content delivery based on user preferences, in accordance with another example embodiment.

FIG. 4 depicts an example method for content delivery based on user preferences, in accordance with another example embodiment.

The method starts at operation 405.

At operation 410, profiles of a plurality of users are accessed. The profile of a user includes user preferences as described herein, for example in FIG. 2. The user preferences can be collected at various points using various technologies.

At operation 415, rules are applied based on profile of a user (e.g., a first user) to identify a first plurality of content sources. The rules are predefined user preferences for filtering out the content sources at first go.

At operation 420, a first trade-off analysis is performed to determine a second plurality of content sources from the first plurality of content sources. The second plurality of content sources is a subset of the first plurality of content sources. The trade-off analysis includes applying sensitivity rules to shortlist the content sources relevant for the user based on the sensitivity. The sensitivity of each user to at least one of a cost parameter, a content parameter, a viewing parameter, a hardware parameter, a channel parameter, a network parameter, and an advertising parameter is used for performing the first trade-off analysis. Examples of each parameter are described with reference to FIG. 2. Various suitable algorithms can be used for this purpose.

At operation 425, a first report including content options from the second plurality of content sources is generated.

At operation 430, an input is received from the first user selecting a first content option. In some embodiments, the content options are already optimized content options because they are selected based on the trade-off analysis performed post application of rules. The trade-off analysis is automated and hence, no user input is needed unlike FIG. 3.

At operation 435, the first content option is implemented for the user.

The method stops at operation 440.

It should be noted that the operations 415 to 435 are described for the content delivery to a single user for the description purposes only, for example, for the first user. However, it should be noted that these operations can also performed simultaneously for a second user or any number of users of the plurality of users.

Figure 5:
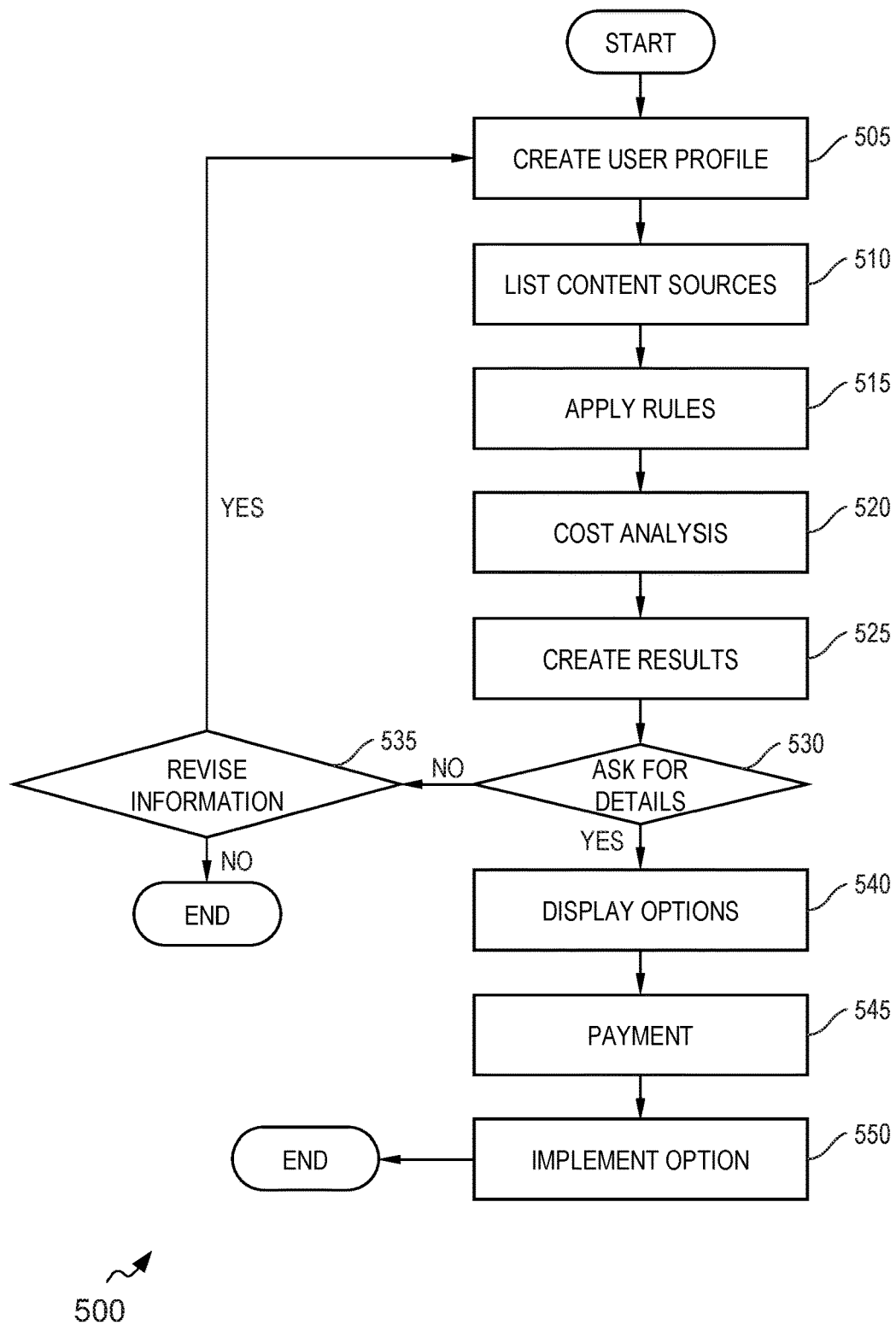
FIG. 5 depicts an example method for user-optimized content delivery, in accordance with an example embodiment.

FIG. 5 depicts an example method for user-optimized content delivery, in accordance with an example embodiment.

A user-optimized (or consumer-optimized) content delivery process 500 begins at a create user profile operation 505. A user inputs information on an access device which may then be uploaded as a user profile in a database. Device may also gather information from device metadata or attached sensors and upload the gathered information along with the consumer inputted information. The uploaded information is used to create the initial list of content sources operation 510.

A list content sources operation 510 uses part or all of the uploaded information to determine available content sources that may be selected by a user.

A set of all available content sources is formed and is processed in an apply rules operation 515. Logical rules may be applied to the set of content sources to determine an optimal configuration for a consumer. Logical rules may be, but not limited to, a set of content requirements, an over the air broadcast channel availability based on physical address, a presence of required shows and other entertainment content available through various content providers, an acceptable delay(s) in being able to watch shows and other entertainment content from subscriber's view, a content delay in general and by specific content from content provider, an importance of cost savings versus potential loss of content, a number of TVs that consumer requires to have streamed video present; a number of TVs needed to have a same stream on at a time, a present use of streaming video solutions, a name of service/content packages, and/or a degree of aversion to advertising supported services.

The set of content sources is further processed in a cost analysis operation 520. The cost analysis step 520 analyzes each content source's cost by considering factors such as, but not limited to, monthly subscription fees, contract termination fees, selected installation costs, up front equipment costs, per TV equipment requirements to support multi-stream content on each TV, "pay per" pricing for TV series, sports and other digital entertainment content, and/or OTA (over the air) HD antenna costs.

A create results operation 525 creates a results report outlining basic details of consumer content source options such as, but not limited to, a recommended number of streaming video and digital entertainment providers necessary to meet consumer requirements, a number of OTA HD channels available, an "$$$" icon indicating estimated cost of upfront equipment, a complexity of installation icon indicating difficulty of installing solution, an indicator and/or brief description of impact of viewing preferences on available content versus overall costs, and an estimated savings for subscriber if suggested solution is adopted.

A consumer may select to view more details regarding one or more plans detailed in the results reported from create results operation 525.

An ask for details operation 530 allows the consumer to ask for further details regarding one or more content source configurations. If the consumer decides not to ask for additional details, an information revision operation 535 may be performed wherein a consumer may choose to modify their user profile and/or add additional information.

If a consumer decides to ask for additional details, a display options operation 540 is performed and additional details and/or options such as, but not limited to, a number of streaming video and digital entertainment providers necessary to meet consumer requirements, an identification of specific providers and related listing of favorite shows and/or other entertainment content by specific streaming provider, a monthly subscription costs for listed providers necessary to support in-home TV streaming requirement(s), a presence of advertising supported content, a number of OTA HD channels available, an estimated cost of upfront equipment, an impact of viewing preferences on available content versus cost savings to switch, a recommended OTA HD antenna by manufacturer or model number, an estimated cost of a recommended OTA HD antenna, a technical ability rating needed to install the recommended solution, a technical rating of installation, an overall net cost savings over a given length of time, a cost of phone support for consumer self-installation, a cost of in-home installation and in-home training that could be provided by the service company, a set of links to self-installation guides specific to a recommended solution, an alternative paid TV providers in the subscriber's area, and/or a set of current offers by paid TV providers in the subscriber's area.

A consumer may then decide to select an optimized content delivery configuration and view payment options in a payment operation 545.

After payment is confirmed, the selected optimized content delivery configuration is implemented in an implement option operation 550.

It may be appreciated by a person with ordinary skill in the art that any business model may be applied at any point in the consumer-optimized content delivery process 500. A business model may be, but not limited to, a subscription model, a fee to view detailed reports, a set of fees for phone support, an advertising fee revenue model, services model, a retail commission model, an affiliate link revenue model, a recommendation or referrer revenue from third parties, a sponsorship, a paid content model, a paid placement model, a licensed content model, a micropayments model, selling home topology guides to specific "how to" installations, rebranding of a system by a third party for a fee or percent of revenue, and/or an exit through sale of a patent to the third party. In another embodiment of the present disclosure, at ask for details operation 530, a consumer may have to pay a fee to see a detailed report on optimized content delivery configurations.

It may be appreciated by a person with ordinary skill in the art that there are a variety of payment means for the payment operation 545. The payment operation 545 include payment means such as, but not limited to, entering credit card information on a secure terminal, calling a payment service on a phone, sending physical check via US Post Office or through private service such as UPS® and FedEx®. In another embodiment of the present disclosure, the payment operation 545 may be performed by a payment module on a third party server including but not limited to digital wallet payment service, PayPal®, SWIPE®, or charging to their wireline or wireless mobile carrier billing system.

It may be appreciated by a person with ordinary skill in the art that an implement option operation 550 may have a variety of implementation means. The implement option operation 550 may be, but not limited to, a consumer receiving instructions to implement a content delivery configuration, a computer executing instructions to schedule an installation team for a consumer via email, a computer executing instructions to notify a call center rep to call a potential subscriber to arrange an installation or support phone call, sending a text confirmation to subscriber of the transaction with or without a calendar scheduling link, sending a message via short messaging service, making an automated telephone call based on expected date his work order will start, making an automated telephone call based on completed online order, calling a support line when services are on hand, delivering "how to" emails and/or diagrams to a consumer for self-installation, arranging support and/or installation by retail or OEM partner(s), arranging support and/or installation by current or new paid TV service provider, and/or arranging support and/or installation by company contracted to service provider. It is contemplated that all of these various motivations for contacting the consumer may be done via any conventional communication means including but not limited to, texting, live phone call from rep, automated phone call from computer, etc., performed in any suitable combination. In another embodiment of the present disclosure, the implement option operation 550 includes a computer executing instructions to subscribe a consumer to a content source.

Figure 6:
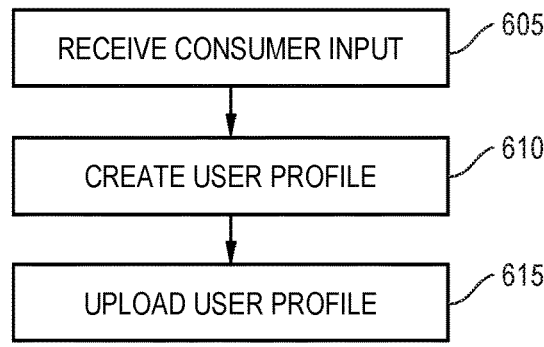
FIG. 6 depicts an example method for gathering consumer information, in accordance with an example embodiment.

FIG. 6 depicts an example method for gathering consumer information on an ingestion module, in accordance with an example embodiment.

A gathering consumer information process 600 comprises a receiving consumer input operation 605, a create user profile operation 610, and an upload user profile operation 615.

A consumer inputs information on an access device in the receiving consumer input operation 605. The consumer inputted information is used to create a user profile for the consumer in a create user profile operation 610. The user profile may then be uploaded to a database or core services module in an upload user profile operation 615. In one embodiment, the method includes filling out online profile that stores inputs in MySql database on server. The profile is shared with the analytics beck end for calculating of values pertaining to services and equipment selection, sources and prices The resulting data and user specific reports and information is uploaded to the front end server for storage of same. In another embodiment the entire process is done on the server, or is split in a different fashion between the server and ancillary computing platforms.

It may be appreciated by a person with ordinary skill in the art that the information inputted by the consumer in the receiving consumer input operation 605 may be nearly any kind of information. Consumer inputted information may be, but not limited to, a physical address, the number of levels in the home structure, presence of a basement, topology of the home network, a home networking communications medium, one or more existing TV antenna(s), demographic information, one or more favorite shows or content genres, an importance of content genres, an importance of specific shows, a monthly bill for entertainment content from paid content providers, an indicator of willingness to delay a viewing of content, an indicator of how much a subscriber is willing to delay a viewing of entertainment content, a subscription to communications bundles, a price of subscriptions to communication bundles, an expiration date of any bundled communications bundles, an expiration date of any individual component within a bundled package, an answer to technical expertise survey, an in-home bandwidth, a number of TVs that a consumer desires to stream video to, a number of TVs needed to have a stream on at same time, a present use of streaming video solutions, a name of a streaming service or content package, an indication of whether such service is advertising based or membership based, and/or a degree of aversion to advertising supported content. In another embodiment of the present disclosure, a consumer may input information regarding family content preferences and/or spousal content preferences.

It may be appreciated by a person with ordinary skill in the art that information may be obtained in the receiving consumer input operation 605 without consumer input. Information obtained without consumer input may be, but not limited to, an access device's specifications, an access device's metadata and/or sensor data, an internet browser name, an internet browser version, a set of hardware components, an operating system, a payment application, a screen resolution, a keyboard profile, a real-time geographic location, a set of location search queries, a wireless phone number, a type of device or mobile network being used, a device's IMEI number or SIM card ID, a set personal information, a set of settings, a set of preferences, any other personally identifiable information, an interaction with third party social networking sites and other third party websites and/or services, a carrier ID, a tower ID, a signal strength of visible WiFi or cell tower(s), and/or a set of Wi-Fi access point(s). In an alternative embodiment of the present disclosure, information may be gathered from a consumer's access device, such as consumer's geographic location, without consumer input.

It may be appreciated by a person with ordinary skill in the art that information regarding a consumer's wired and/or wireless infrastructure may be gathered in the gathering consumer information process 600. Information may be gathered by, but not limited to, consumer input, metadata and/or wireless environment data gathered from an access device, public property records, and data electronically or manually provided by marketing, affiliate, or current paid content provider. In another embodiment of the present disclosure, a consumer's wired and/or wireless infrastructure may be gathered by photos uploaded by a consumer or resulting from a query to a third party mapping database, such as Google Maps®.

It may be appreciated by a person with ordinary skill in the art that a consumer difficulty rating may be determined in receiving consumer input operation 605. A consumer difficulty rating may be determined by executing an algorithm on a set of factors such as, but not limited to, a consumer self-rating technical expertise, a consumer's wireless and/or wired infrastructure, a content source installation difficulty, a consumer's prior experience with using computers as media sources for home networks, and/or a consumer's prior experience with streaming services and equipment as evidenced through listing of existing streaming video services presently subscribed to. The consumer difficulty rating may also be derived via a questionnaire as part of the online ordering process. The questionnaire may request the potential user to answer a series of questions and/or scenarios that presents a technical problem and then may provide a series of answers to pick from to solve the problem. The series of questions may become more complex and it may become more difficult to choose between the provided answers as a consumer proceeds. A number of correct answers determine the technical expertise score. In another embodiment of the present disclosure, a consumer's difficulty rating may be determined by a weighted consideration of a consumer's technical expertise score as compared to the rated difficulty of the recommended streaming solution. In another embodiment of the present disclosure, a consumer's difficulty rating may be determined through integrating a third party's rating system of like nature or different. In another embodiment of the present disclosure, rating of the complexity of various installations could be provided by professional home theater/security technicians.

It may be appreciated by a person with ordinary skill in the art that one or more steps in the gathering consumer information process 600 may be added, removed, or rearranged. In another embodiment of the present disclosure, gathering consumer information process 600 may omit steps of asking consumer to provide physical layout of dwelling and number of levels, process of deriving consumer's technical expertise, and determining cost sensitivity to loss of content. In still another embodiment of the present disclosure, the order of steps in gathering consumer information process 600 may occur in any order. In still another embodiment of the present disclosure, additional steps such as, but not limited to, extrapolating information from consumer preferences, acquiring information on an access device's capabilities, acquiring third party geo-location services, searching public information databases, searching affiliate databases, searching advertising databases and programs, searching content provider databases, and/or searching manufacturer databases may be added to the gathering consumer information process 600.

Figure 7:
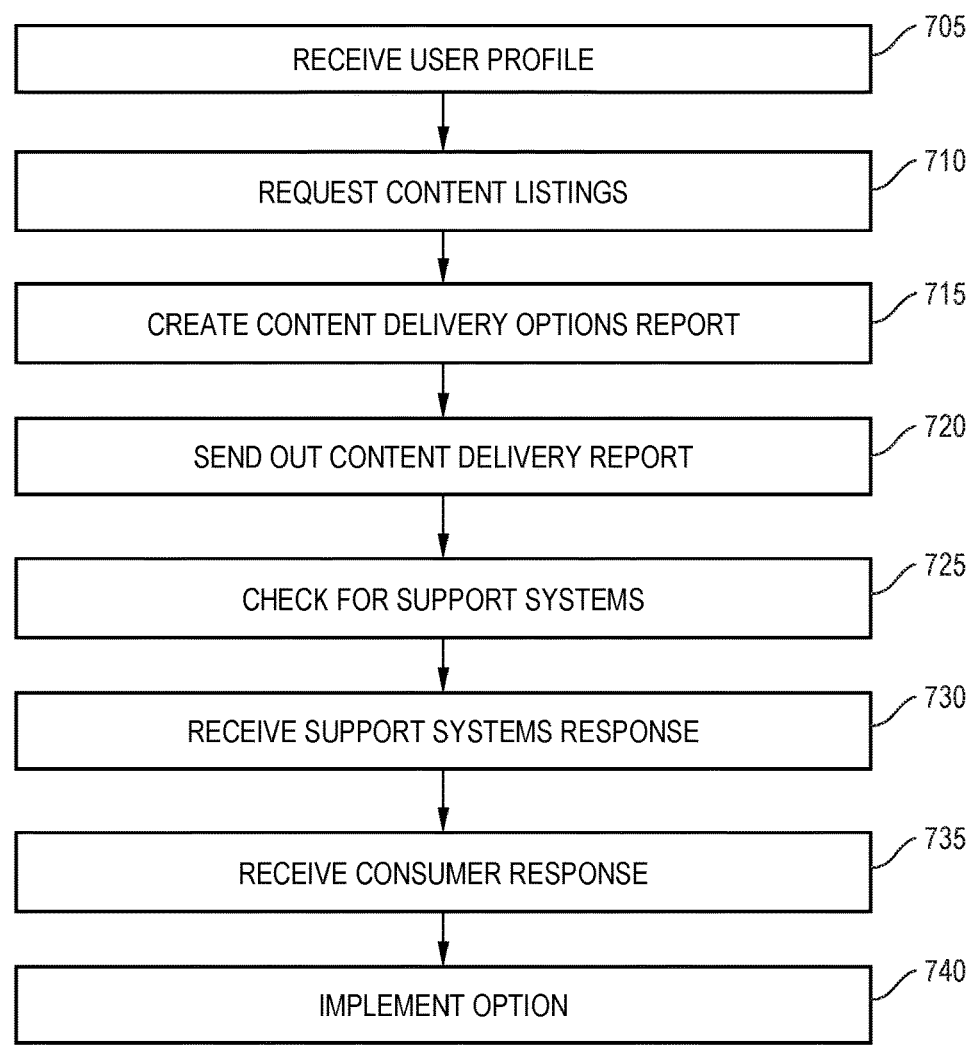
FIG. 7 depicts an example method for content delivery optimization, in accordance with an example embodiment.

FIG. 7 depicts an example method for content delivery optimization on a core services module, in accordance with an example embodiment.

A content delivery optimization process 700 comprises a receive user profile operation 705, a request listings operation 710, a create content delivery options report operation 715, a send content delivery report operation 720, a check for support systems operation 725, a receive support systems response operation 730, a receive consumer response operation 735, and an implement option operation 740.

A user profile containing information from a consumer is sent from an ingestion module in the receive user profile operation 705. Part and/or all of the information from the consumer's user profile may be used to form a search query for content delivery listings. A request for content listings is sent to a listing acquisition module in the request listings operation 710. Content listings returned from the listing acquisition module may then be processed by rules and/or algorithms implementing information from a consumer's user profile such as, but not limited to, a set of content preferences, a set of service provider preferences, a physical address, the number of levels in the home structure, presence of a basement, topology of the home network, a home networking communications medium, one or more existing TV antenna(s), demographic information, one or more favorite shows or content genres, an importance of content genres, an importance of specific shows, a monthly bill for entertainment content from paid content providers, an indicator of willingness to delay a viewing of content, an indicator of how much a subscriber is willing to delay a viewing of entertainment content, a subscription to communications bundles, a price of subscriptions to communication bundles, an expiration date of any bundled communications bundles, an expiration date of any individual component within a bundled package, an answer to technical expertise survey, an in-home bandwidth, a number of TVs that a consumer desires to stream video to, a number of TVs needed to have a stream on at same time, a present use of streaming video solutions, a name of a streaming service or content package, an indication of whether such service is advertising based or membership based, and/or a degree of aversion to advertising supported content.

A content delivery report is created detailing the available content delivery configurations that meet a consumer's preferences in the create content delivery options report operation 715. The content delivery report is sent out to a presentation module to be formatted for consumer viewing in the send content delivery report operation 720. In the check for support systems operation 725, core services module checks for support systems that may add further functionality such as, but not limited to, providing additional information, providing additional content listing rules, providing support services, providing history of subscriber profile activity, providing history of subscriber's order history, providing history or audit trail related to processing of online order internally or through third party payment systems, providing service automobile statistics and scheduled replacement date of individual service automobiles, providing installation schedules and history of activities by technician or order information, providing content recommendation by subscriber, providing device capabilities, providing network access capabilities, providing a history of electronic and/or physical notifications resulting from interactions with the content delivery system, providing a listing of current paid content providers, checking the availability of alternative providers in customer's area, calculating costs of alternative providers, calculating the effect of bundled offers, determining the presence of any national or local regulatory impacts to analysis, determining content listed by provider and/or online streaming provider, authenticating a subscriber via password and/or other security systems, and/or tracking a system entry by unauthorized external sources or queries. Core services module waits for a support systems response in the receive support systems response operation 730 and may also receive information such as, but not limited to, additional data, rules, updated content listings, whether listings come from targeted sources and are authentic, whether listings do not or do contain malware or other detrimental software, whether no outside sources have been allowed access or provided input to analysis or have had access to the optimized content delivery system, whether a user is returning or new, subscriber equipment images, model numbers, retailer SKU numbers, retail pricing, home network listing and topology as it relates to the users recommended streaming installation, open times for full service installation service calls and estimated duration of each, historical record of customer payments by service category, recording and tracking of consumer orders for installation and/or customer support services, payment for services has cleared and transaction is closed.

A consumer may decide to select a content delivery configuration from the content delivery report in the receive consumer response operation 735. Upon receiving consumer verification for implementing a content delivery configuration, core services module begins to implement the selected content delivery configuration in the implement option operation 740.

Core services module may have a means to implement part and/or all of a content delivery configuration such as, but not limited to, a computing device to initiate content delivery subscriptions, a communications device to schedule installation of content sources, a computing device to run a series of algorithms that finds lowest cost source of priority content, a database to add content and/or device requirements, a database containing a library of home network configurations for various streaming scenarios, a computing device to provide automated rules based report that shows impacts of physical issues in the home.

It may be appreciated by a person with ordinary skill in the art that the check for support systems operation 725 may selectively check for specific support systems based on various factors. Factors may include, but not limited to, consumer preferences, consumer hardware, network status, creating an account, logging into an existing account, submitting an online form, returning answers creating a listings database, analyzing home networking application and/or database, equipment databases, security systems, OTA channel system and access control system, changing content priority settings, changing physical location, changing content requirements and/or preferences, placing an order for more detail, placing an order for phone support, placing an order for in-home installation. In one embodiment of the present disclosure, support systems may be checked based on a level of complexity of a content delivery configurations and a level of technical expertise of a consumer. In another embodiment of the present disclosure, support systems may be checked based on support system latency.

It may be appreciated by a person with ordinary skill in the art that one or more support systems may be checked and activated at any step in the content delivery optimization process 700. In an alternative embodiment of the present disclosure, support systems may be activated at a plurality of steps in the content delivery optimization process 700 in order to provide support such as, but not limited to, faster network communication.

It may be appreciated by a person with ordinary skill in the art that one or more operations in the content delivery optimization process 700 may be added, removed, or rearranged. In another embodiment of the present disclosure, the content delivery optimization process 700 may omit steps of providing customized content source listings based on viewing behaviors, home networking configuration, consumer's technical expertise, OTA channel analysis and equipment recommendations, securing priority of content, determining sensitivity to cost and sensitivity to content loss. In still another embodiment of the present disclosure, the order of steps such as, but not limited to, determining subscriber location, subscriber first name, subscriber last name, home networking layout, present paid TV monthly bill amount, technical capability questions, paid TV service provider, wireless provider, current video streaming subscriptions and costs, and/or upfront equipment costs in the content delivery optimization process 700 may occur in any order. In still another embodiment of the present disclosure, additional steps such as, but not limited to, ranking content delivery configurations by consumer preferences, performing analysis of bundles in terms of cost impact of cutting service and having to add unbundled components instead, adding alternative content providers that offer less expensive stand-alone components and the prices for each, providing content recommendations based on content preferences, providing priorities and cost sensitivities, and/or providing equipment referrals via links to retailer or OEM websites may be added to the content delivery optimization process 700.

Figure 8:
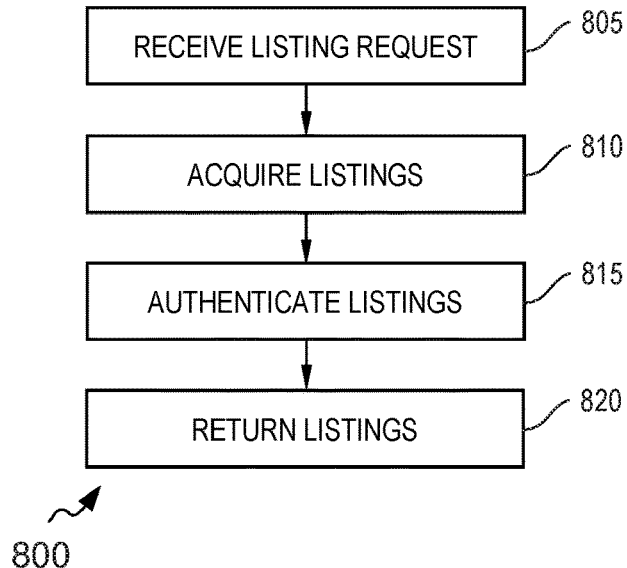
FIG. 8 depicts an example method for content listing acquisition, in accordance with an example embodiment.

FIG. 8 depicts an example method for content listing acquisition on a listings acquisition module, in accordance with an example embodiment.

A content listing acquisition process 800 comprises a receive listings request operation 805, an acquire listings operation 810, an authenticate listings operation 815, and a return listings operation 820.

A content listing acquisition request is received from a core services module in the receive listings request operation 805. Content listings are acquired based on a user's profile information in the acquire listings operation 810. Listings are authenticated to ensure listings acquired are accurate and contains no malware and/or viruses in the authenticate listings operation 815. Authenticated listings are returned to the core services module in the return listings operation 820.

It may be appreciated by a person with ordinary skill in the art that acquired listing in the acquire listings operation 810 may be any kind of listing. Acquired listings may be, but not limited to, online content listings, over the air content listings, cable content listings, IPTV content listings, third party SVOD content listings, third party AVOD (advertising supported video on demand) content listings, UG (user generated) content listings, public online listings, mobile content listings, original content listings, video blogs (VLOGs), webinars, online interviews, product reviews, testimonials, and/or other forms of information presented in video form. In another embodiment of the present disclosure, over the air content listings may be acquired based on information from a consumer's user profile such as, but not limited to, geographic location and home network infrastructure.

It may be appreciated by a person with ordinary skill in the art that acquired listings may be authenticated in various ways. Authentication may be, but not limited to, checking for a security certification from providers such as Verisign® or Thawte®, acquiring listings directly from providers through developer APIs, implementing access control to prevent unauthorized content sources being inserted by other parties, and/or using encrypted feed of listings via protocols such as Secure Shell (SSH) and Socket Layer (SSL) from commercial content originators. In another embodiment of the present disclosure, listings may be authenticated by software defined protection.

It may be appreciated by a person with ordinary skill in the art that one or more steps in the content listing acquisition process 800 may be added, removed, or rearranged. In another embodiment of the present disclosure, the content listing acquisition process 800 may be done via manual data entry based on published listings by streaming video sources and omit steps of encryption, access control and authentication. In still another embodiment of the present disclosure, the order of steps in the content listing acquisition process 800 may occur in any order. In still another embodiment of the present disclosure, additional steps such as, but not limited to, metadata logging of listings data may be added to the content listing acquisition process 800.

Figure 9:
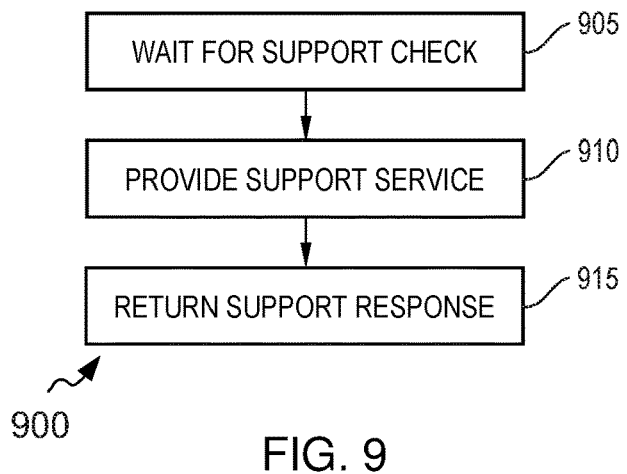
FIG. 9 depicts an example method for support extensions on a support system module, in accordance with an example embodiment.

FIG. 9 depicts an example method for support extensions on a support system module, in accordance with an example embodiment.

A support extensions process 900 comprises a wait for support check operation 905, a provide support service operation 910, and a return support response operation 915. A support system module waits for a check for support systems from a core services module in the support check operation 905. A support service is performed in the provide support service operation 910 and any results and/or responses are returned to the core services module in the return support response operation 915.

It may be appreciated by a person with ordinary skill in the art that support services performed in the support extensions process 900 may be nearly any system. Support services may be, but not limited to, order management systems, subscriber management systems, payment verification modules, dispatching modules, fleet management systems, Customer Relationship Management (CRM) systems, customer authentication systems, data security systems, and/or a combination thereof. In another embodiment of the present disclosure, the support extensions process 900 may provide additional information from a database to a core services module.

It may be appreciated by a person with ordinary skill in the art that one or more steps in the support extensions process 900 may be added, removed, or rearranged. In another embodiment of the present disclosure, the support extensions process 900 may omit steps of activating dispatching module, fleet management, customer authentication and data security systems. In still another embodiment of the present disclosure, the order of steps in the support extensions process 900 may occur in any order. In still another embodiment of the present disclosure, additional steps such as, but not limited to, establishing a secure connection to a third party customer database, a third party service scheduling application, a third party customer support provider, and sending queries and receiving return data from internal databases, may be added to the support extensions process 900.

Figure 10:
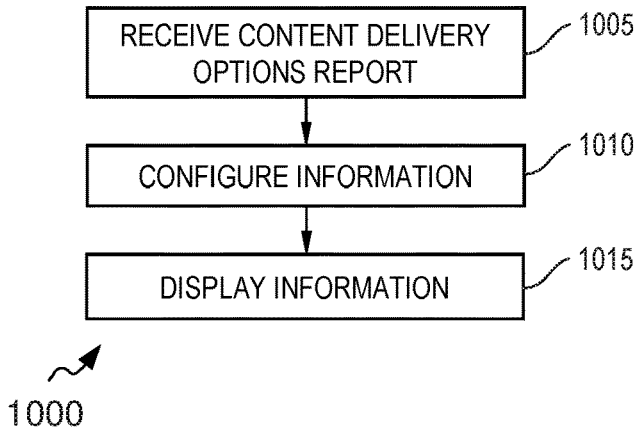
FIG. 10 depicts an example method for presentation, in accordance with an example embodiment.

FIG. 10 depicts an example method for presentation on a presentation module, in accordance with an example embodiment.

A presentation process 1000 comprises a receiving content delivery options report operation 1005, a configure information operation 1010, and a display information operation 1015. In the receiving content delivery options report operation 1005, the presentation module waits for a content delivery options report to be sent from a core services module. The information from the content delivery options report is configured for presentation in the configure information operation 1010 and then displayed on an access device for a consumer to view in the display information operation 1015.

It may be appreciated by a person with ordinary skill in the art that the configure information operation 1010 may configure information differently according to various factors. Information may be configured according to factors such as, but not limited to, physical dimension of access device screen space, processor speed of device, storage availability of access device, length of consumer questionnaire according to capability of access device, number of pages required to show information on one screen size versus another screen size, resolution of access device, in-home bandwidth speeds, hardware specifications, consumer selected templates, online forms, type of transmittal, and/or use of web page markup languages.

In another embodiment of the present disclosure, information may be displayed according to physical dimension of access device screen space, processor speed of device, storage availability of access device, length of consumer questionnaire according to capability of access device, number of pages required to show information on one screen size versus another screen size, resolution of access device screen, display aspect ratio of access device screen, in-home bandwidth speeds, hardware specifications, consumer selected templates, online forms, type of transmittal, and/or use of web page markup languages. It may be appreciated by a person with ordinary skill in the art that one or more steps in the presentation process 1000 may be added, removed, or rearranged. In another embodiment of the present disclosure, the presentation process 1000 may omit steps of adapting presentation to access device screen size, access device screen resolution, access device display aspect ratio or access device pixel count. In still another embodiment of the present disclosure, the order of steps in the presentation process 1000 may occur in any order. In still another embodiment of the present disclosure, additional steps such as, but not limited to, compression of received data, rearrangement of report structure as presented to the consumer, rearrangement of types of content as presented to the consumer, and/or retrieval of access device capabilities or display information may be added to the presentation process 1000.

Figure 11:
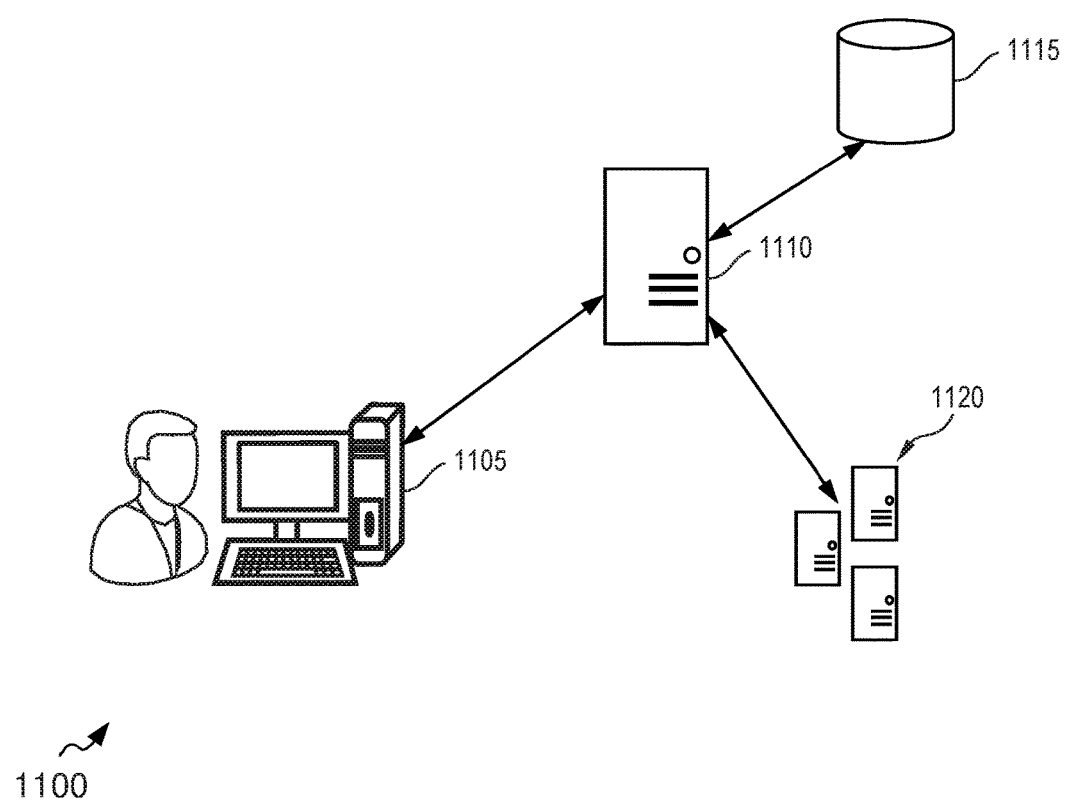
FIG. 11 illustrates an exemplary user-optimized content delivery system, in accordance with an example embodiment.

FIG. 11 illustrates an exemplary user-optimized content delivery system, in accordance with an example embodiment.

A consumer-optimized content delivery system 1100 comprises an access terminal 1105, a core services server 1110, a profile database 1115, and one or more support system servers 1120.

During typical operation, a consumer inputs information into the access terminal 1105 and a user profile is created. The access terminal 1105 may also gather information from metadata and/or sensors attached to the access terminal 1105 and through querying access terminal 1105's browser's operating system, discrete hardware components, and wireless protocol support. Information from the access terminal 1105 is associated to a user profile which is uploaded to the core services server 1110 and stored in the profile database 1115. The core services server 1110 uses a consumer's user profile to determine content delivery options available to a consumer.

A basic report of available content delivery configurations is generated and a consumer may view the basic report on the access terminal 1105. The consumer may then have the option to view a more detailed report for a fee. A detailed report may disclose additional information regarding content delivery configurations such as, but not limited to, a number of streaming video and digital entertainment providers necessary to meet consumer requirements, an identification of specific providers and related listing of favorite shows and/or other entertainment content by specific streaming provider, a monthly subscription costs for listed providers necessary to support in-home TV streaming requirement(s), a presence of advertising supported content, a number of OTA HD channels available, an estimated cost of upfront equipment, an impact of viewing preferences on available content versus cost savings to switch, a recommended OTA HD antenna by manufacturer or model number, an estimated cost of a recommended OTA HD antenna, a technical ability rating needed to install the recommended solution, a technical rating of installation, an overall net cost savings over a given length of time, a cost of phone support for consumer self-installation, a cost of in-home installation and in-home training by company, a set of links to self-installation guides specific to a recommended solution, and/or streaming content usage comments and appropriate regulatory or legal notices.

The support system servers 1120 may support the core services server 1110 at any point during typical operation by means such as, but not limited to, providing OTA channel availability, determining lowest cost source of priority content, determining in-home bandwidth speed, determining home network installation steps, determining physical location of nearest OTA broadcast tower, compiling content listings, suggesting installation steps based on home network configuration, providing a subscriber TV count, providing a subscriber TV count requiring simultaneous streaming, providing subscriber streaming provider recommendations, recommending ancillary equipment, acquiring software needed for using PC as media hub, acquiring ancillary equipment images, acquiring logos of streaming providers, acquiring subscriber information, acquiring order information, determining last customer contact, retrieving a call history of a subscriber, providing content preferences and priorities, creating a third party retailer or OEM listing, displaying advertisements, checking available installation times, checking fleet availability for installations, listing phone numbers for customer support, acquiring content provider information, and/or other measures that may come up as the service matures.

It may be appreciated by a person with ordinary skill in the art that there may be a plurality of any element in the system 1100. The system 1100 may have, but not limited to, a plurality of access terminals 1105, a plurality of profile databases 1115, and a plurality of support system servers 1120. In another embodiment of the present disclosure, the system 1100 may have a plurality of core services servers 1110 that provide different parts of a core service from discrete physical locations. It may be appreciated by a person with ordinary skill in the art that the functions of one or more elements in the system 1100 may be performed by one or more other elements. The system 1100 may have, but not limited to, servers and/or databases merged in one computing platform. In another embodiment of the present disclosure, the core services server 1115 may be configured to download parts of service logic to the access terminal 1105, based on device capabilities including, but not limited to, process speed, storage information, screen resolution, display aspect resolution, and/or wireless protocol support returned by the access terminal 1105 in response to a query by the core services server 110.

It may be appreciated by a person with ordinary skill in the art that the access terminal 1105 may be any device capable of receiving a user input and relaying information to a user. The access terminal 1105 may be, but not limited to, a computer terminal, a smartphone, a laptop, a desktop, an all-in-one computer, a tablet, a netbook, an ultrabook, a personal digital assistant (PDAs), a gaming consoles, a Chromebook®, a Cloudbook®, a Chromebox®, a Kindle®, a mobile phone, a modular smartphone, an iPhone®, an electronic tech wearable, a smart TV, a voice recognition application installed on an access device or terminals, a wireless or wired online chat, a wireless or wired short messaging service, and/or a wired or wireless multimedia communications services. In another embodiment of the present disclosure, access terminal 1105 may be a desktop computer. In an alternative embodiment of the present disclosure, access terminal 1105 may be a kiosk in a public facility that relays user profile information to a dedicated data center, shared data center, or data cloud infrastructure core services server 1110 and support systems module 1120. In still another alternative embodiment, a retention application found in core services server 1110 is integrated into other algorithms and sends a notification of service cancellation interest to a user's current paid content provider.

It may be appreciated by a person with ordinary skill in the art that part or all of a consumer-optimized content delivery system 1100 may be implemented by a business. The consumer-optimized content delivery system 1100 may also be used indirectly by a company to promote business. In an another embodiment of the present disclosure, consumers located in a heavily rural location where it is difficult to get broadcast TV pay to use the consumer-optimized content delivery system 1100 to find alternative internet entertainment via OTT (over the top) streaming. In still another embodiment of the present disclosure, streaming content providers may use consumer-optimized content delivery system 1100 as a way to drive interactivity between the consumer and the streaming content providers and to establish opportunities to upsell content based on a consumer's behavior profile. In yet another embodiment of the present disclosure, a consumer electronics retailer may host a consumer-optimized delivery system 1100 on a kiosk in a store as a way to suggest services and/or equipment to a customer. In yet another embodiment of the present disclosure, a consumer-optimized content delivery system 1100 is branded by a security and/or home theater installation company as a way to expand the security and/or home theater installation company's service offerings. In still another embodiment of the present disclosure, algorithms executing in the core services server 1110 may be applied by a business-to-consumer business that is seeking to maximize sales when a consumer must consider multiple trade-offs before purchasing a content delivery service.

Figure 12:
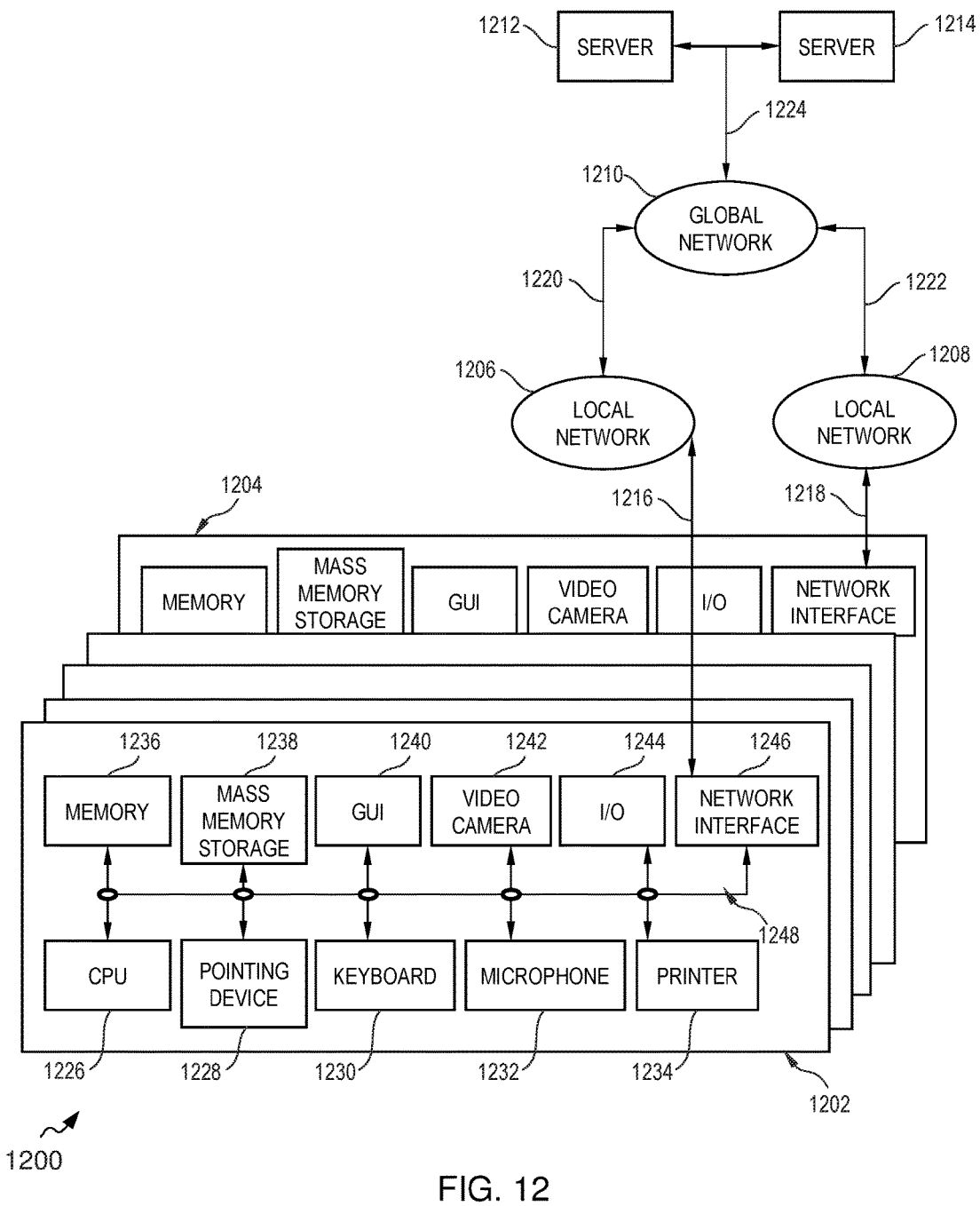
FIG. 12 is a block diagram depicting an example of a client/server communication system, in accordance with an example embodiment.

FIG. 12 is a block diagram depicting an example of a client/server system, in accordance with an example embodiment.

A communication system 1200 includes a multiplicity of clients with a sampling of clients denoted as a client 1202 and a client 1204, a multiplicity of local networks with a sampling of networks denoted as a local network 1206 and a local network 1208, a global network 1210 and a multiplicity of servers with a sampling of servers denoted as a server 1212 and a server 1214.

The client 1202 may communicate bi-directionally with the local network 1206 via a communication channel 1216. The client 1204 may communicate bi-directionally with the local network 1208 via a communication channel 1218. The local network 1206 may communicate bi-directionally with the global network 1210 via a communication channel 1220. The local network 1208 may communicate bi-directionally with the global network 1210 via a communication channel 1222. The global network 1210 may communicate bi-directionally with the server 1212 and the server 1214 via a communication channel 1224. The server 1212 and the server 1214 may communicate bi-directionally with each other via the communication channel 1224. Furthermore, the clients 1202, 1204, local networks 1206, 1208, global network 1210 and servers 1212, 1214 may each communicate bi-directionally with each other.

In one embodiment, the global network 1210 may operate as the Internet. It will be understood by those skilled in the art that the communication system 1200 may take many different forms. Non-limiting examples of forms for the communication system 1200 include local area networks (LANs), wide area networks (WANs), wired telephone networks, wireless networks, or any other network supporting data communication between respective entities.

The clients 1202 and 1204 may take many different forms. Non-limiting examples of the clients 1202 and 1204 include personal computers, personal digital assistants (PDAs), cellular phones and smartphones.

The client 1202 includes a CPU 1226, a pointing device 1228, a keyboard 1230, a microphone 1232, a printer 1234, a memory 1236, a mass memory storage 1238, a GUI 1240, a video camera 1242, an input/output interface 1244, and a network interface 1246.

The CPU 1226, the pointing device 1228, the keyboard 1230, the microphone 1232, the printer 1234, the memory 1236, the mass memory storage 1238, the GUI 1240, the video camera 1242, the input/output interface 1244 and the network interface 1246 may communicate in a unidirectional manner or a bi-directional manner with each other via a communication channel 1248. The communication channel 1248 may be configured as a single communication channel or a multiplicity of communication channels.

The CPU 1226 may comprise a single processor or multiple processors. The CPU 1226 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, the memory 1236 is used typically to transfer data and instructions to the CPU 1226 in a bi-directional manner. The memory 1236, as discussed previously, may include any suitable computer-readable media, intended for data storage, such as those described above excluding any wired or wireless transmissions unless specifically noted. The mass memory storage 1238 may also be coupled bi-directionally to the CPU 1226 and provides additional data storage capacity and may include any of the computer-readable media described above. The mass memory storage 1238 may be used to store programs, data and the like and is typically a secondary storage medium such as a hard disk or electronic solid state drive (SSD). It will be appreciated that the information retained within the mass memory storage 1238, may, in appropriate cases, be incorporated in standard fashion as part of the memory 1236 as virtual memory.

The CPU 1226 may be coupled to the GUI 1240. The GUI 1240 enables a user to view the operation of computer operating system and software. The CPU 1226 may be coupled to the pointing device 1228. Non-limiting examples of the pointing device 1228 include computer mouse, trackball, touchscreen, touchpad, and screen gesturing. The pointing device 1228 enables a user with the capability to maneuver a computer cursor about the viewing are of the GUI 1240 and select areas or features in the viewing area of GUI 1240. The CPU 1226 may be coupled to the keyboard 1230. The Keyboard 1230 enables a user with the capability to input alphanumeric textual information to the CPU 1226. The CPU 1226 may be coupled to the microphone 1232. The microphone 1232 enables audio produced by a user to be recorded, processed and communicated by the CPU 1226. The CPU 1226 may be connected to the printer 1234. The printer 1234 enables a user with the capability to print information to a sheet of paper or to a digital storage document. The CPU 1226 may be connected to the video camera 1242. The video camera 1242 enables video produced or captured by user to be recorded, processed and communicated by the CPU 1226.

The CPU 1226 may also be coupled to the input/output interface 1244 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, the CPU 1226 optionally may be coupled to the network interface 1246 which enables communication with an external device such as a database or a computer or telecommunications or Internet network using an external connection shown generally as the communication channel 1216, which may be implemented as a hardwired or wireless communications link using suitable conventional technologies. With such a connection, the CPU 1226 might receive information from the network, or might output information to a network in the course of performing the method steps described in the teachings of the present disclosure.

Figure 13:
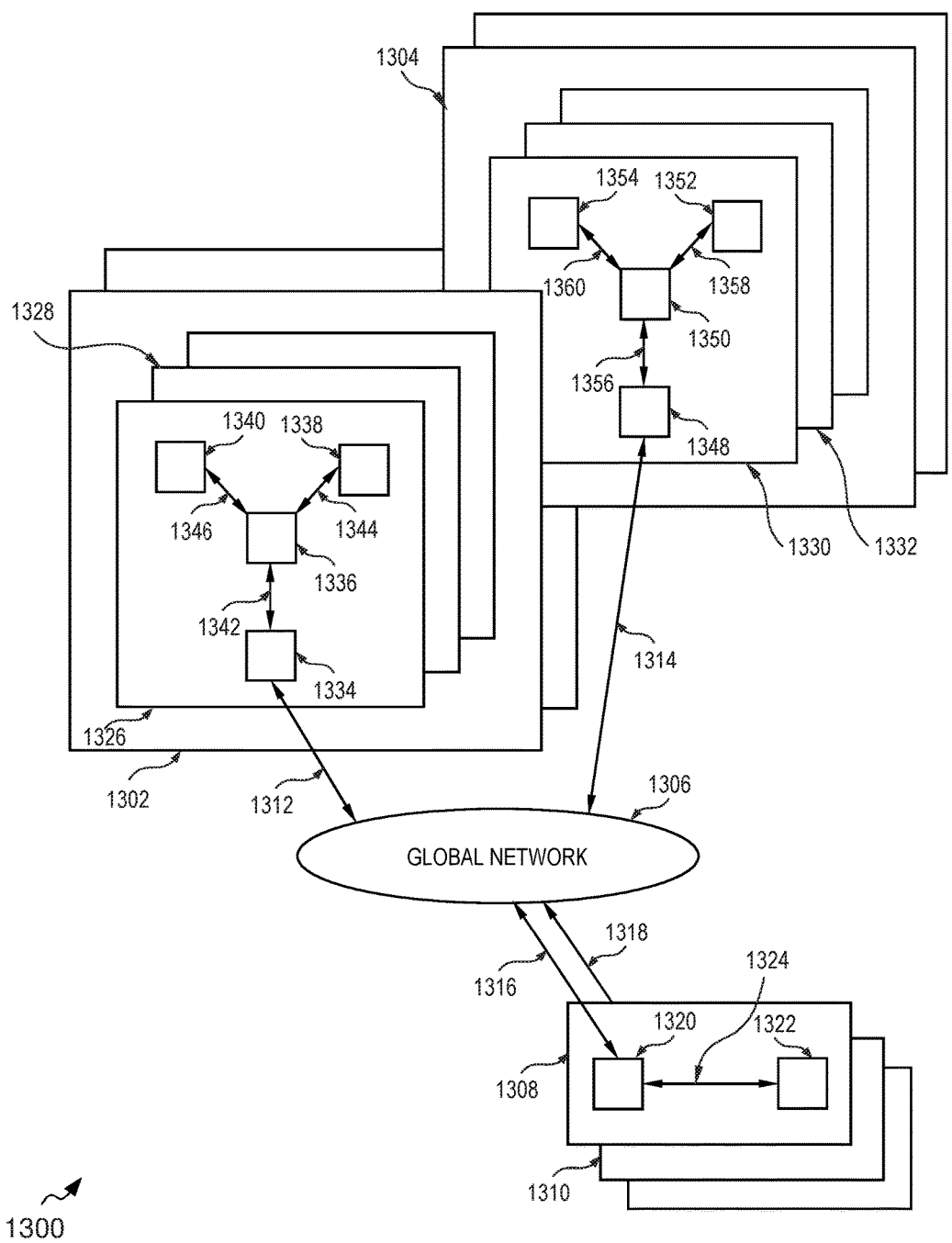
FIG. 13 illustrates a block diagram depicting another example client/server communication system, in accordance with another example embodiment.

FIG. 13 illustrates a block diagram depicting another example client/server communication system, in accordance with another example embodiment.

A communication system 1300 includes a multiplicity of networked regions with a sampling of regions denoted as a network region 1302 and a network region 1304, a global network 1306 and a multiplicity of servers with a sampling of servers denoted as a server device 1308 and a server device 1310.

The network region 1302 and the network region 1304 may operate to represent a network contained within a geographical area or region. Non-limiting examples of representations for the geographical areas for the networked regions may include postal zip codes, telephone area codes, states, counties, cities and countries. Elements within the network regions 1302 and 1304 may operate to communicate with external elements within other networked regions or within elements contained within the same network region.

In some implementations, the global network 1306 may operate as the Internet. It will be understood by those skilled in the art that the communication system 1300 may take many different forms. Non-limiting examples of forms for the communication system 1300 include local area networks (LANs), wide area networks (WANs), wired telephone networks, cellular telephone networks or any other network supporting data communication between respective entities via hardwired or wireless communication networks. The global network 1306 may operate to transfer information between the various networked elements.

The server device 1308 and the server device 1310 may operate to execute software instructions, store information, support database operations and communicate with other networked elements. Non-limiting examples of software and scripting languages which may be executed on the server device 1308 and the server device 1310 include C, C++, C# and Java.

The network region 1302 may operate to communicate bi-directionally with the global network 1306 via a communication channel 1312. The network region 1304 may operate to communicate bi-directionally with the global network 1306 via a communication channel 1314. The server device 1308 may operate to communicate bi-directionally with the global network 1306 via a communication channel 1316. The server device 1310 may operate to communicate bi-directionally with the global network 1306 via a communication channel 1318. The network regions 1302 and 1304, the global network 1306 and the server devices 1308 and 1310 may operate to communicate with each other and with every other networked device located within the communication system 1300.

The server device 1308 includes a networking device 1320 and a server 1322. The networking device 1320 may operate to communicate bi-directionally with the global network 1306 via the communication channel 1316 and with the server 1322 via a communication channel 1324. The server 1322 may operate to execute software instructions and store information.

The network region 1302 includes a multiplicity of clients with a sampling denoted as a client 1326 and a client 1328. The client 1326 includes a networking device 1334, a processor 1336, a GUI 1338 and an interface device 1340. Non-limiting examples of devices for the GUI 1338 include monitors, televisions, cellular telephones, smartphones and PDAs (Personal Digital Assistants). Non-limiting examples of the interface device 1340 include pointing device, mouse, trackball, scanner and printer. The networking device 1334 may communicate bi-directionally with global network 1306 via the communication channel 1312 and with the processor 1336 via a communication channel 1342. The GUI 1338 may receive information from the processor 1336 via a communication channel 1344 for presentation to a user for viewing. The interface device 1340 may operate to send control information to the processor 1336 and to receive information from the processor 1336 via a communication channel 1346. The network region 1304 includes a multiplicity of clients with a sampling denoted as a client 1330 and a client 1332. The client 1330 includes a networking device 1348, a processor 1350, a GUI 1352 and an interface device 1354. Non-limiting examples of devices for the GUI 1338 include monitors, televisions, cellular telephones, smartphones and PDAs (Personal Digital Assistants). Non-limiting examples of the interface device 1340 include pointing devices, mouse, trackballs, scanners and printers. The networking device 1348 may communicate bi-directionally with the global network 1306 via the communication channel 1314 and with the processor 1350 via a communication channel 1356. The GUI 1352 may receive information from the processor 1350 via a communication channel 1358 for presentation to a user for viewing. The interface device 1354 may operate to send control information to the processor 1350 and to receive information from the processor 1350 via a communication channel 1360.

For example, consider the case where a user interfacing with the client 1326 may want to execute a networked application. A user may enter the IP (Internet Protocol) address for the networked application using the interface device 1340. The IP address information may be communicated to the processor 1336 via the communication channel 1346. The processor 1336 may then communicate the IP address information to the networking device 1334 via the communication channel 1342. The networking device 1334 may then communicate the IP address information to the global network 1306 via the communication channel 1312. The global network 1306 may then communicate the IP address information to the networking device 1320 of the server device 1308 via the communication channel 1316. The networking device 1320 may then communicate the IP address information to the server 1322 via the communication channel 1324. The server 1322 may receive the IP address information and after processing the IP address information may communicate return information to the networking device 1320 via the communication channel 1324. The networking device 1320 may communicate the return information to the global network 1306 via the communication channel 1316. The global network 1306 may communicate the return information to the networking device 1334 via the communication channel 1312. The networking device 1334 may communicate the return information to the processor 1336 via the communication channel 1342. The processor 1346 may communicate the return information to the GUI 1338 via the communication channel 1344. User may then view the return information on the GUI 1338.

It is to be appreciated that the system components can be implemented using one processor or multiple processors or using one system or using multiple systems as described in FIG. 2.

It is to be appreciated that the profiles and the reports can be saved in at least one of portable document format (PDF), document, excel, worksheet, text or any other format and means of transmitting such information, including printed, digital (visual), digital/analog verbal (recorded voice file such as MP3), Braille or a combination of any and all mediums and forms.

Figure 14:
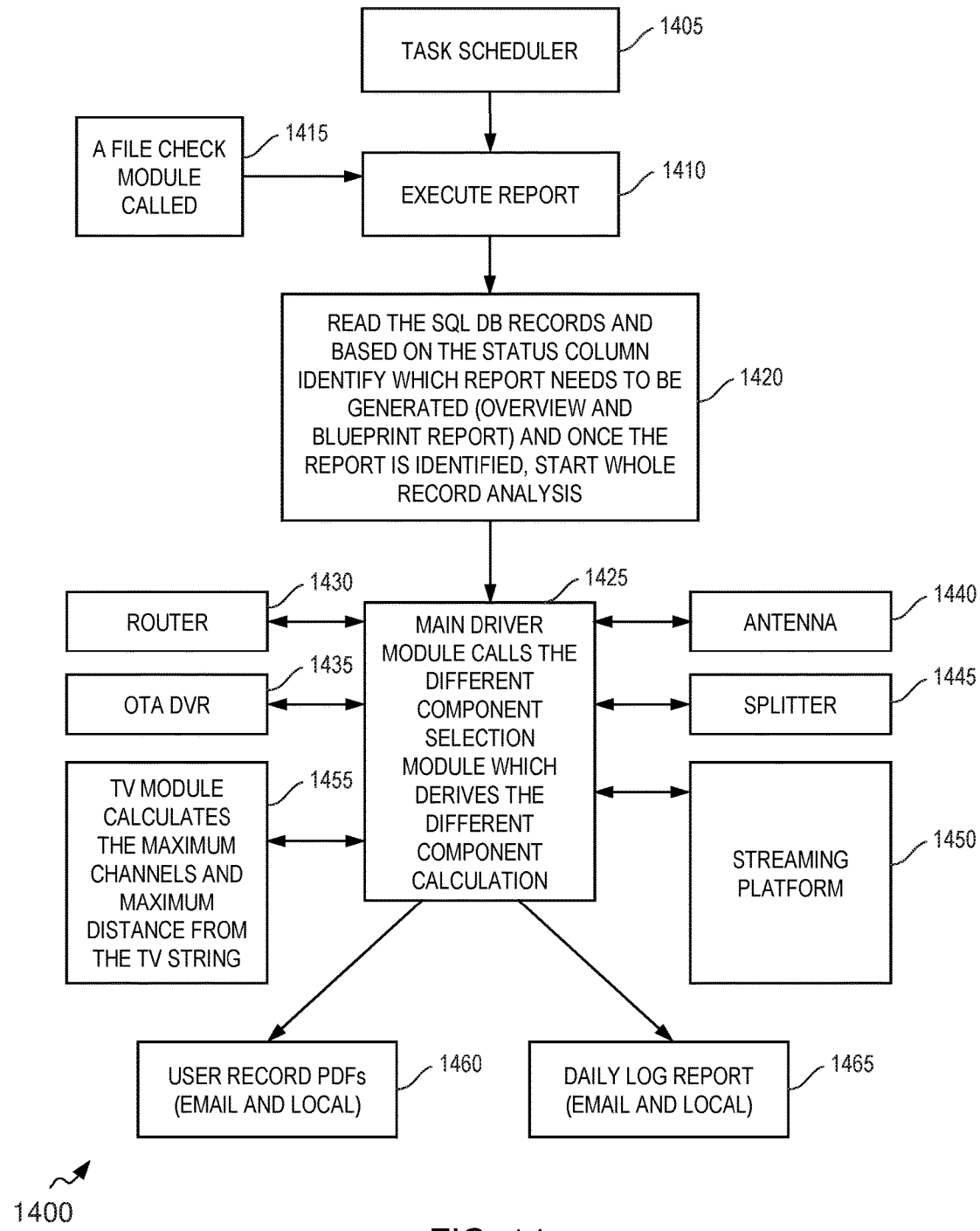
FIG. 14 illustrates an exemplary data flow among various system elements, in accordance with an example embodiment.

FIG. 14 illustrates an exemplary data flow 1400 among various system elements, in accordance with an example embodiment.

A task scheduler 1405 is called for running one or more macros for performing the method described herein. It is to be appreciated that macro is used as an example and any other code or language can be used and the disclosure is not just limited to macros. In an embodiment, the task scheduler 1405 runs a visual basic (VB) script for running the macros. The VB script is scheduled at particular time every day and the streaming macro is executed to process the PDFs, i.e. the profiles.

As a part of macro execution, the report is executed at an operation 1410. Further, a file check module 1415 is called. The file check module 1415 checks the daily log file and if a duplicate daily log file exists for current date then it deletes the daily log file. If the duplicate daily log file is not present then the new daily log file is created with all the required tabs in it. The previous run rejected records are copied to rejected records worksheet in the daily log. The program checks for records there and reruns them, along with new records, in the next cycle. Rejected records mean the profile is corrupted, a database is corrupted, or there is data, either internal to the system or via 3$^{rd}$ party, what is missing but required by the program as part of algorithm(s).

At operation 1420, the SQL DB records are read as part of the macro, and based on the status column, it is identified that which report needs to be generated (Overview and blueprint Report). Once the report is identified, then whole record analysis is started. The two reports, i.e. overview report and the blueprint report can be selected by the user and can be generated based on the user profiles or optimization inputs or both. The reject report is also generated based on the various conditions.

For example, if no episode is present in the TV listing sheet the user record is rejected, and antenna rejected record is identified and written to the rejected report.

At operation 1425, a macro corresponding to a main driver module is called. This is the driver module which calls the different system modules for deriving different component calculations. The logics performed by different modules such as the core services module etc., are now described.

1) Delete Logic: This contains the cleanup logic for a form temporary sheet where various sections from the previous run so that the new details are placed on a new user record. The sections cleared are broadcast, streaming platform cost, show per season and monthly subscription. It also clears home network layout and channel listing section.

2) This module identifies the location where the report PDFs are saved.

3) This module reads the execute report sheet and identifies if the email with reports or PDFs is to be sent or not.

4) This module calls the different component selection module which calculates the best suited module as per the user record setup and fetches all the required details (e.g., Component Name, Minimum Cost, Component description, Source URL).

5) There is a section where the different sections of the blueprint report are placed dynamically such as Show broadcast, Monthly Subscription, Per Season Pay section. All these sections are calculated in the module StreamSrvcs.

6) The Channel TV string is calculated using the "Channels" column in the SQL DB sheet "Column K" and this is placed under the "Channel Listing" section. There is a separate module "TV" for calculation.

7) There is a separate module for calculating the width of the component description dynamically for each user record and it is set up accordingly.

At operation 1425, interaction with various system elements or modules is performed to either receive inputs or provide outputs or to perform both input and output exchange as part of data exchange. For example, at operation 1430 data exchange with router is performed, at 1435 with OTA DVR, at 1440 with antenna, at 1445 with splitter, and at 1450 with streaming platform is performed. Each of this is explained further with reference to FIGS. 15 to 19.

At operation 1455, a TV module calculates the maximum channels and maximum distance from the TV string and provides it to the operation 1425. At the operation 1425, outputs reports are provided in form of user record PDFs 1460 and daily log report 1465.

In various embodiments, macro reads the SQL DB records and based on the status column identifies which report needs to be generated (Overview and blueprint Report). The records are processed by hitting the "Execute Reports" button at 1410. In some embodiments, there is a new macro created that controls how many records are processed so the memory resources are flushed and the speed of processing is optimized. The overall processing is lanched from this macro, which then launches the main macro. Based on the logic different components and their corresponding costs are calculated and based on the different component cost the total costs and total savings, i.e. optimizations and trade-off analysis, are determined for the user.

In one form, there may be different processing criteria for generating the emails and daily logs. For example, in case the need is to process the records and generate the PDFs and not to send an email to the user, it needs to be handled accordingly. In case of ABEND processing, there is no need to save the macro and close the macro as without saving the macro is restored to the last saved state. ABEND herein means the macro crashes in the middle of processing.

Figure 15:
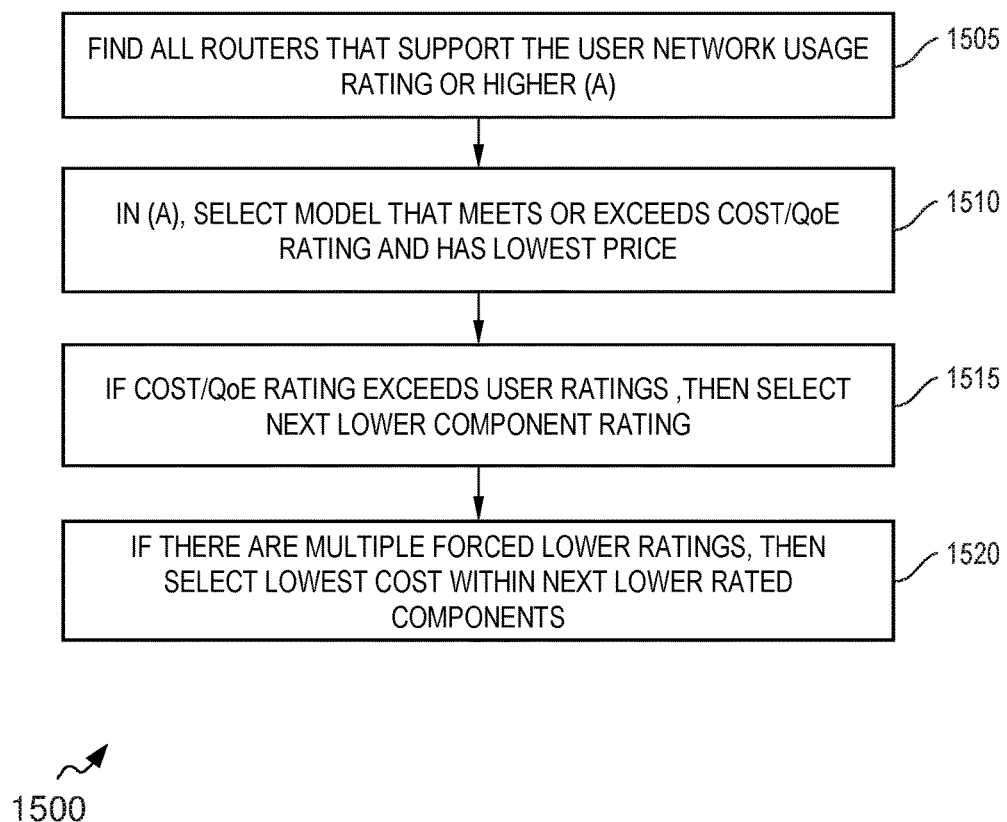
FIG. 15 illustrates an exemplary data flow corresponding to a router, in accordance with an example embodiment.

FIG. 15 illustrates an exemplary data flow 1500 corresponding to a router, in accordance with an example embodiment.

At operation 1505, all routers that support the user network usage rating or higher are found. At operation 1510, model that meets or exceeds Cost/QoE (e.g., Q20) rating and has the lowest price, is selected.

At operation 1515, if the cost/QoE rating exceeds the user ratings, then next lower component rating is selected.

At operation 1520, if there are multiple ratings within forced lower ratings, then select the lowest cost within next lower rated components.

Figure 16:
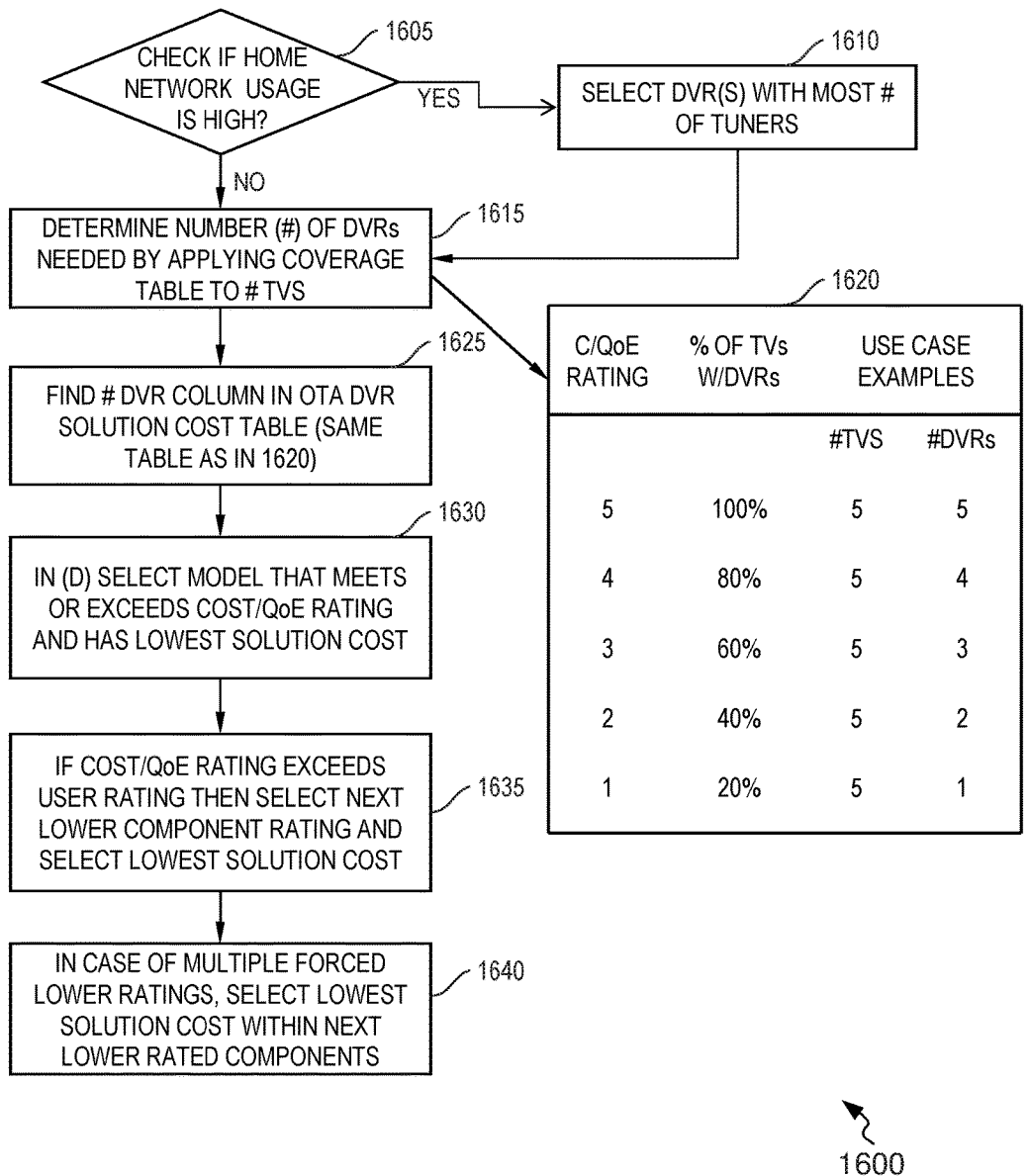
FIG. 16 illustrates an exemplary data flow corresponding to over the air digital video recorder (OTR DVR), in accordance with an example embodiment.
Figure 17:
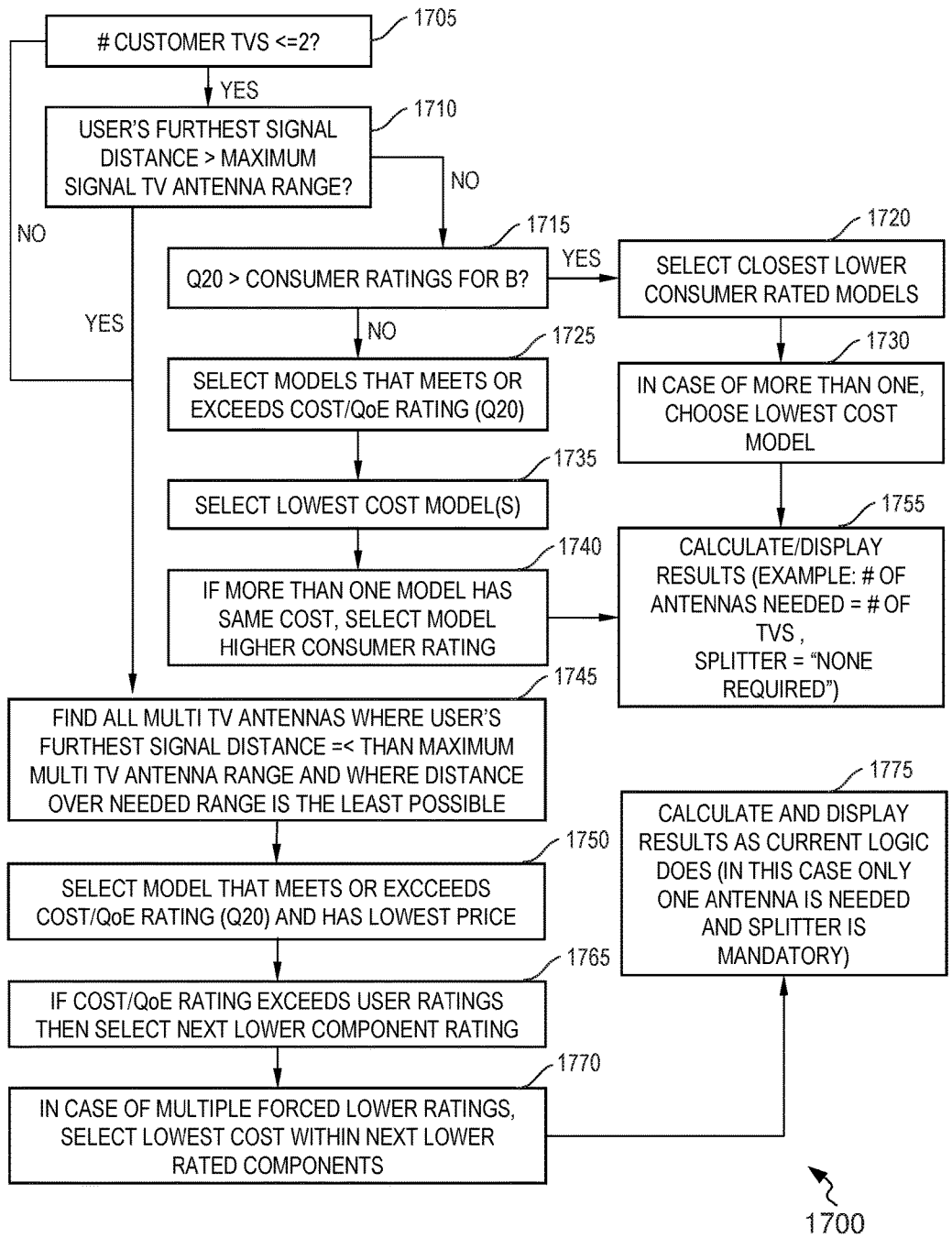
FIG. 17 illustrates an exemplary data flow corresponding to an antenna, in accordance with an example embodiment.

FIG. 16 illustrates an exemplary data flow 1600 corresponding to OTR DVR, in accordance with an example embodiment.

At operation 1605, it is checked if a home network usage is high. If the home network usage is high, then at operation 1610, DVRs with most # (number) of tuners is selected. If not, then at operation 1615, the number (#) of DVRs is determined by applying coverage table to number (#) of TVs, for example, as shown in a table 1620.

At operation 1625, a number of DVR columns is found in OTA DVR solution cost table (same table as currently used).

At operation 1630, model is selected that meets or exceeds cost/QoE rating and is of lowest solution cost.

If cost/QoE rating exceeds user ratings, then next lower component rating is selected at operation 1635 and the lowest solution cost is also selected. If there are multiple forced lower rating, then the lowest solution cost within next lower rated components is selected at operation 1640.

FIGS. 17A and 17B illustrate an exemplary data flow 1700 corresponding to an antenna, in accordance with an example embodiment.

At operation 1705, a check is performed to determine if # of customer TVs is less than or equal to two. If no, then operation 1745 is performed.

If the # of customer TVs is less than or equal to two, then at operation 1710, another check is performed to determine if user's further signal distance is greater than maximum signal TV antenna range. If yes, then operation 1745 is performed and if no then operation 1715 is performed.

At operation 1715, a check is performed to determine if Q20 is greater than consumer ratings for B. If yes, then operation 1720 is performed else operation 1725 is performed.

At operation 1725, model that meets or exceeds Cost/QoE rating (Q20) is selected. At 1735, the lowest cost model is selected. At operation 1740, if more than one model has same cost, then model with high consumer rating is selected. At operation 1755, results are calculated and displayed. Results include # of antennas, # of TVs, and splitter (for example, none required) etc.

At operation 1720, closest lower consumer rate models are selected. If there are more than one models selected at the operation 1720, then lowest cost model is selected at operation 1730. Further, the results are calculated and displayed at operation 1755.

At operation 1745, all multi TV antennas where user's furthest signal distance is equal to or less than maximum multi TV antenna range and where distance over needed range is the least possible, are found.

At operation 1750, model that meets or exceeds Cost/QoE rating (Q20) and has the lowest price, is selected. At operation 1765, if the cost/QoE rating exceeds user ratings, then next lower component rating is selected. At operation 1770, if multiple ratings are there within forced lower rating, then the lowest cost within next lower rated components is selected. At operation 1775, results are calculated and displayed as current logic does. In an example scenario, at operation 1775, only one antenna is needed and splitter is mandatory.

Figure 18:
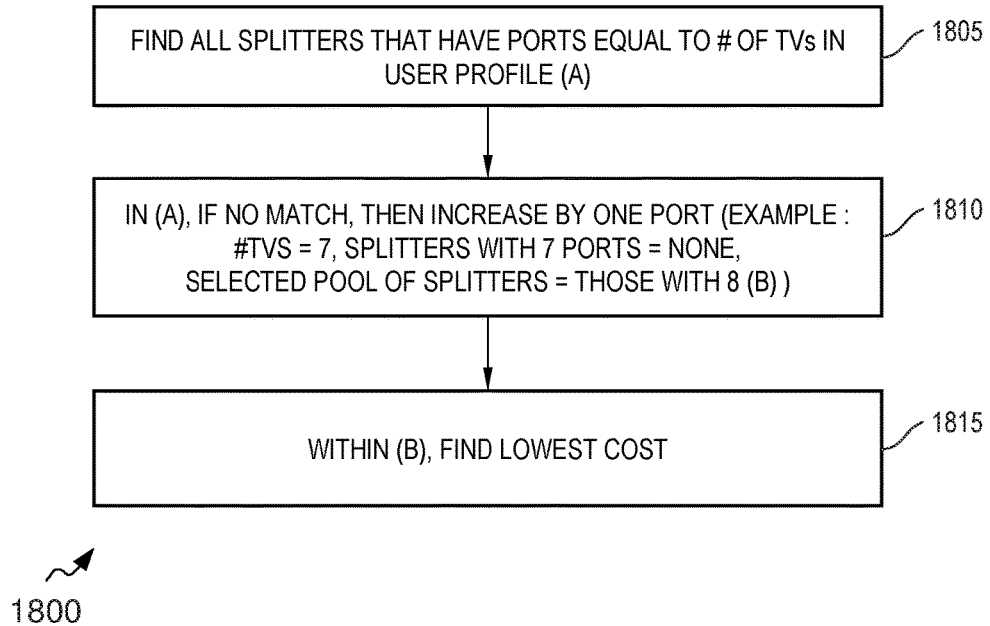
FIG. 18 illustrates an exemplary data flow corresponding to a splitter, in accordance with an example embodiment.

FIG. 18 illustrates an exemplary data flow 1800 corresponding to a splitter, in accordance with an example embodiment.

At operation 1805, all splitters that have ports equal to # of TVs in user profile (A) are found. At operation 1810, if in (A), there is no match found then increase by one port. For example, #TVs=7, splitters with 7 ports=none, then selected pool of splitters=those with 8 (B). At operation 1815, the lowest cost within (B) is found.

Figure 19:
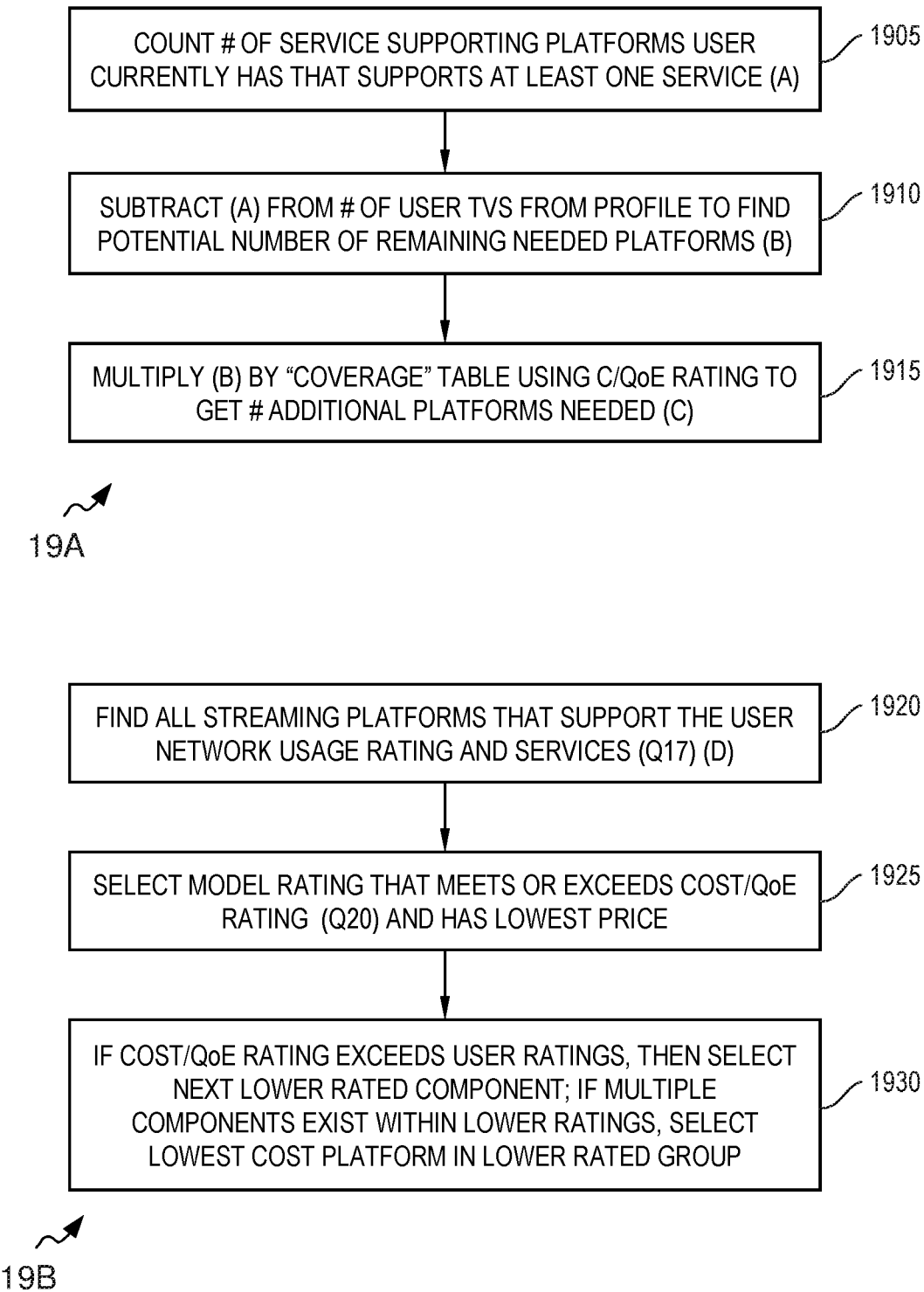
FIG. 19 illustrates an exemplary data flow corresponding to a streaming platform, in accordance with an example embodiment.

FIG. 19 illustrates an exemplary data flow corresponding to a streaming platform, in accordance with an example embodiment. FIG. 19 shows two data flows, i.e. 19A from operations 1905 to 1915 indicating how many additional streaming platforms are needed and 19B from operations 1920 to 1930 indicating platform finding.

At operation 1905, # of service supporting platforms user currently has that supports at least one service (A) is found. At operation 1910, (A) from # of user TVs from profile is subtracted to find potential number of remaining needed platforms (B). At operation 1915, (B) is multiplied by "coverage" table using C/QoE rating to get # of additional platforms needed (C).

At operation 1920, all streaming platforms that support the user network usage rating and services (Q17) (D) are found. At operation 1925, model rating that meets or exceeds Cost/QoE rating (Q20) and has lowest price is selected. At operation 1930, if Cost/QoE rating exceeds user ratings, then select next lower rated component. If multiple components exist within lower rating, then lowest cost platform is selected in lower rated group.

It is to be appreciated that FIGS. 14 to 19 define data flow for various system modules and can be performed by one or more data modules, and these figures merely represent one specific example embodiment and should not be considered as limiting to the scope of the present disclosure.

Embodiments of the invention are discussed herein with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present disclosure, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present disclosure is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present disclosure. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present disclosure. Structures described herein are to be understood also to refer to functional equivalents of such structures. The present disclosure is described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present disclosure also includes any novel feature or any novel combination of features disclosed herein either explicitly or implicitly or any generalization thereof, whether or not it relates to the same invention as presently claimed in any Claim and whether or not it mitigates any or all of the same technical problems as does the present disclosure.

Features which are described in the context of separate embodiments may also be provided in combination in a single embodiment. Conversely, various features which are, for brevity, described in the context of a single embodiment, may also be provided separately or in any suitable sub combination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present disclosure which claims an embodiment "consisting essentially of" a certain set of elements of any herein described embodiment it shall be understood as obvious by those skilled in the art that the present disclosure also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present disclosure that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present disclosure.

As is well known to those skilled in the art many careful considerations and compromises typically must be made when designing for the optimal manufacture of a commercial implementation any system, and in particular, the embodiments of the present disclosure. A commercial implementation in accordance with the spirit and teachings of the present disclosure may configured according to the needs of the particular application, whereby any aspect(s), feature(s), function(s), result(s), component(s), approach(es), or step(s) of the teachings related to any described embodiment of the present disclosure may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present disclosure can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media. When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present disclosure need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present disclosure and likewise, object methods or behaviors can be used to implement the processes of the present disclosure.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present disclosure may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments of the present disclosure may provide means and/or methods for consumer-optimized content delivery services. Some of these embodiments may comprise computer software. In some of these embodiments, software may be integrated into hardware, including, without limitation, uniquely-designed hardware for running embodiment software. The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims.

What is claimed is:

1. A system for content delivery based on user preferences, the system comprising:
   a memory to store instructions; and
   a processor coupled to the memory and configured to perform a method for content delivery based on user preferences in response to the instructions, the method comprising:
   accessing profiles of a plurality of users, the profiles comprising sensitivity of each user to at least one of a cost parameter, a content parameter, a viewing parameter, a hardware parameter, a channel parameter, a network parameter, and an advertising parameter, performing a first trade-off analysis to determine a plurality of content delivery options for providing content to a first user of the plurality of users wherein the first trade-off analysis is based on profile of the first user comprising the sensitivity of the first user, generating a first report comprising at least one content delivery option from the plurality of content delivery options, receiving an input from the first user for optimizing the at least one content delivery option, generating an optimized first report comprising a first optimized content delivery option, and implementing the first optimized content delivery option to provide content to the first user;

wherein the processor further performs:

performing a second trade-off analysis to determine another plurality of content delivery options for providing content to a second user, wherein the second trade-off analysis is based on profile of the second user comprising the sensitivity of the second user;

generating a second report comprising at least one content delivery option from another plurality of content delivery options, wherein the second report has different content delivery options than the first report;

receiving an input from the second user for optimizing the at least one content delivery option, wherein the input received from the second user for optimizing is different from the input received from the first user for optimizing;

generating an optimized second report comprising a second optimized content delivery option; and implementing the second optimized content delivery option to provide content to the second user.

2. The system as claimed in claim 1, wherein the processor further performs:

receiving inputs from the plurality of users for at least one of the cost parameter, the content parameter, the viewing parameter, the hardware parameter, the channel parameter, the network parameter, and the advertising parameter; and generating the profiles of the plurality of users.

3. The system as claimed in claim 1, wherein the processor further performs:

automatically receiving data from access device of at least one user of the plurality of users user for generating profile of the at least one user.

4. The system as claimed in claim 1, wherein the processor further performs:

saving the profiles in at least one of portable document format (PDF), document, excel, worksheet and text.

5. The system as claimed in claim 1, wherein the processor further performs:

authenticating the plurality of content delivery options.

6. The system as claimed in claim 1, wherein the processor further performs:

configuring the first report based on an access device of the first user.

7. A method of content delivery based on user preferences, the method comprising:

accessing profiles of a plurality of users;

applying rules based on a profile of a first user of the plurality of users to identify a first plurality of content sources for providing content to the first user;

performing a first trade-off analysis to determine a second plurality of content sources from the first plurality of content sources for providing content to the first user, wherein the first trade-off analysis is based on sensitivity of the first user to at least one of a cost parameter, a content parameter, a viewing parameter, a hardware parameter, a channel parameter, a network parameter, and an advertising parameter;

generating a first report comprising content options from the second plurality of content sources;

receiving an input from the first user selecting a first content option; and implementing the first content option for the first user to provide the content to the first user from the first content option;

applying rules based on profile of a second user to identify a third plurality of content sources for providing content to the second user;

performing a second trade-off analysis to determine a fourth plurality of content sources from the third plurality of content sources for providing content to the second user, wherein the second trade-off analysis is based on sensitivity of the second user to at least one of the cost parameter, the content parameter, the viewing parameter, the hardware parameter, the channel parameter, the network parameter, and the advertising parameter;

generating a second report comprising content options from the fourth plurality of content sources;

receiving an input from the second user selecting a second content option; and implementing the second content option for the second user to provide the content to the second user from the second content option, wherein the second content option is different than the first content option.

8. The method as claimed in claim 7 further comprising:

receiving another input selecting trade-off parameter from the content options in the first report; and revising the first report to incorporate content options based on the selected trade-off parameter.

9. The method as claimed in claim 7 and further comprising:

receiving another input from the second user selecting trade-off parameters from the content options in the second report; and revising the second report to incorporate content options based on the selected trade-off parameters.

10. The method as claimed in claim 7 further comprising:

receiving inputs from the plurality of users for at least one of the cost parameter, the content parameter, the viewing parameter, the hardware parameter, the channel parameter, the network parameter, and the advertising parameter; and generating the profiles of the plurality of users.

11. The method as claimed in claim 7 further comprising:

automatically receiving data from access device of at least one user of the plurality of users user for generating profile of the at least one user.

12. The method as claimed in claim 7 further comprising:

saving the profiles in at least one of portable document format (PDF), document, excel, worksheet and text.

13. The method as claimed in claim 7 further comprising:

authenticating the first plurality of content sources.

14. The method as claimed in claim 7 further comprising:

configuring the first report based on an access device of the first user.

15. A non-transitory computer-readable medium having stored instructions which when executed by a system causes the system to perform a method of content delivery based on user preferences, the method comprising:

accessing profiles of a plurality of users, the profiles comprising sensitivity of each user to at least one of a cost parameter, a content parameter, a viewing parameter, a hardware parameter, a channel parameter, a network parameter, and an advertising parameter;

performing a first trade-off analysis to determine a plurality of content delivery options for providing content to a first user of the plurality of users, wherein the first trade-off analysis is based on profile of the first user comprising the sensitivity of the first user;

generating a first report comprising at least one content delivery option from the plurality of content delivery options;

receiving an input from the first user for optimizing the at least one content delivery option;

generating an optimized first report comprising a first optimized content delivery option; and implementing the first optimized content delivery option to provide content to the first user;

performing a second trade-off analysis to determine another plurality of content delivery options for providing content to a second user, wherein the second trade-off analysis is based on profile of the second user comprising the sensitivity of the second user;

generating a second report comprising at least one content delivery option from another plurality of content delivery options, wherein the second report has different content delivery options than the first report;

receiving an input from the second user for optimizing the at least one content delivery option, wherein the input received from the second user for optimizing is different than the input received from the first user for optimizing;

generating an optimized second report comprising a second optimized content delivery option; and implementing the second optimized content delivery option to provide content to the second user.

16. The non-transitory computer-readable medium of claim 15, wherein the method further comprises:

receiving inputs from the plurality of users for at least one of the cost parameter, the content parameter, the viewing parameter, the hardware parameter, the channel parameter, the network parameter, and the advertising parameter; and generating the profiles of the plurality of users.

17. The non-transitory computer-readable medium of claim 15, wherein the method further comprises:

automatically receiving data from access device of at least one user of the plurality of users user for generating profile of the at least one user.

* * * * *